(12) United States Patent
Coffman et al.

(10) Patent No.: US 11,086,292 B2
(45) Date of Patent: *Aug. 10, 2021

(54) METHODS AND APPARATUS FOR MACHINE LEARNING PREDICTIONS OF MANUFACTURING PROCESSES

(71) Applicant: Xometry, Inc., Gaithersburg, MD (US)

(72) Inventors: Valerie R. Coffman, Washington, DC (US); Mark Wicks, Alexandria, VA (US); Daniel Wheeler, Darnestown, MD (US)

(73) Assignee: Xometry, Inc., Gaithersburg, MD (US)

( * ) Notice: Subject to any disclaimer, the term of this patent is extended or adjusted under 35 U.S.C. 154(b) by 194 days.

This patent is subject to a terminal disclaimer.

(21) Appl. No.: 16/454,756

(22) Filed: Jun. 27, 2019

(65) Prior Publication Data

US 2019/0339669 A1    Nov. 7, 2019

Related U.S. Application Data

(63) Continuation of application No. 16/113,835, filed on Aug. 27, 2018, now Pat. No. 10,338,565, which is a (Continued)

(51) Int. Cl.
*G05B 19/4097* (2006.01)
*G06N 5/04* (2006.01)
(Continued)

(52) U.S. Cl.
CPC ......... *G05B 19/4097* (2013.01); *G06N 3/126* (2013.01); *G06N 7/005* (2013.01);
(Continued)

(58) Field of Classification Search
CPC ...... G05B 19/4097; G05B 2219/35204; G05B 2219/35134; G06N 20/20; G06N 20/00;
(Continued)

(56) References Cited

U.S. PATENT DOCUMENTS

6,701,200 B1    3/2004 Lukis et al.
6,836,699 B2   12/2004 Lukis et al.
(Continued)

FOREIGN PATENT DOCUMENTS

WO    WO 2015/058147 A1    4/2015
WO    WO 2015/058152 A1    4/2015
WO    WO 2016/018717 A1    2/2016

OTHER PUBLICATIONS

Extended European Search Report dated Mar. 14, 2018 for European Application No. 17199603.6, 11 pages.
(Continued)

*Primary Examiner* — Ramesh B Patel
(74) *Attorney, Agent, or Firm* — BakerHostetler

(57) ABSTRACT

The subject technology is related to methods and apparatus for training a set of regression machine learning models with a training set to produce a set of predictive values for a pending manufacturing request, the training set including data extracted from a set of manufacturing transactions submitted by a set of entities of a supply chain. A multi-objective optimization model is implemented to (1) receive an input including the set of predictive values and a set of features of a physical object, and (2) generate an output with a set of attributes associated with a manufacture of the physical object in response to receiving the input, the output complying with a multi-objective condition satisfied in the multi-objective optimization model.

22 Claims, 12 Drawing Sheets

Related U.S. Application Data continuation of application No. 15/721,208, filed on Sep. 29, 2017, now Pat. No. 10,061,300.

(51) Int. Cl.
| | |
|---|---|
| *G05B 19/401* | (2006.01) |
| *G06N 20/00* | (2019.01) |
| *G06F 30/00* | (2020.01) |
| *G06N 7/00* | (2006.01) |
| *G06N 3/12* | (2006.01) |
| *G06N 20/20* | (2019.01) |
| *G06N 3/04* | (2006.01) |

(52) U.S. Cl.
CPC ............ *G06N 20/00* (2019.01); *G06N 20/20* (2019.01); *G05B 2219/35134* (2013.01); *G05B 2219/35204* (2013.01); *G06N 3/0454* (2013.01); *G06N 5/04* (2013.01)

(58) Field of Classification Search
CPC ...... G06N 7/005; G06N 3/126; G06N 3/0454; G06N 5/04; Y02P 90/02
See application file for complete search history.

(56) References Cited

U.S. PATENT DOCUMENTS

| | | | |
|---|---|---|---|
| 6,937,966 B1* | 8/2005 | Hellerstein | G06Q 10/06 703/2 |
| 7,089,082 B1 | 8/2006 | Lukis et al. | |
| 7,305,367 B1 | 12/2007 | Hollis et al. | |
| 7,496,528 B2 | 2/2009 | Lukis et al. | |
| 7,590,466 B2 | 9/2009 | Lukis et al. | |
| 7,630,783 B2 | 12/2009 | Walls-Manning et al. | |
| 7,735,033 B2 | 6/2010 | Zhang et al. | |
| 7,840,443 B2 | 11/2010 | Lukis et al. | |
| 8,140,401 B2 | 3/2012 | Lukis et al. | |
| 8,239,284 B2 | 8/2012 | Lukis et al. | |
| 8,560,092 B2 | 10/2013 | Zheng et al. | |
| 8,601,483 B2 | 12/2013 | He et al. | |
| 9,141,743 B1* | 9/2015 | McCracken | G06F 30/392 |
| 9,367,063 B2 | 6/2016 | Herman et al. | |
| 9,441,936 B2 | 9/2016 | Pinkston et al. | |
| 10,061,300 B1 | 8/2018 | Coffman et al. | |
| 10,073,439 B1* | 9/2018 | Jacobs, II | G06Q 30/0283 |
| 10,545,481 B2* | 1/2020 | Jacobs, II | G05B 19/4069 |
| 2003/0083757 A1* | 5/2003 | Card | G05B 19/027 700/28 |
| 2006/0224325 A1 | 10/2006 | Conway et al. | |
| 2007/0038531 A1 | 2/2007 | Lukis et al. | |
| 2007/0112526 A1* | 5/2007 | Chen | G16C 20/30 702/19 |
| 2008/0183446 A1 | 7/2008 | Hansen | |
| 2008/0231307 A1* | 9/2008 | Bickford | G01R 31/2831 324/762.06 |
| 2009/0228846 A1* | 9/2009 | Mcconaghy | G06F 30/36 716/106 |
| 2009/0307638 A1* | 12/2009 | Mcconaghy | G06F 30/36 716/104 |
| 2014/0125663 A1* | 5/2014 | Zhang | G06T 7/155 345/420 |
| 2015/0127480 A1 | 5/2015 | Herman et al. | |
| 2015/0317589 A1* | 11/2015 | Anderson | G06N 7/005 705/7.25 |
| 2016/0033251 A1 | 2/2016 | Pinkston et al. | |
| 2016/0140452 A1 | 5/2016 | Garcia Sedano et al. | |
| 2016/0259323 A1 | 9/2016 | Herman et al. | |
| 2016/0370790 A1 | 12/2016 | Pinkston et al. | |
| 2017/0293269 A1* | 10/2017 | Sharma | G05B 13/028 |
| 2018/0046926 A1* | 2/2018 | Achin | G06Q 10/04 |
| 2018/0120813 A1 | 5/2018 | Coffman et al. | |
| 2019/0202133 A1* | 7/2019 | Jacobs, II | G06F 30/17 |

OTHER PUBLICATIONS

IP, C. Y. & Regli, W. C., "A 3D object classifier for discriminating manufacturing processes," Computers and Graphics, vol. 30, No. 6, pp. 903-916 (2006).

Loyer, J.-L. et al., "Comparison of Machine Learning methods applied to the estimation of manufacturing cost of jet engine components," Int. J. Production Economics, vol. 178, pp. 109-119 (2016).

Serrat, J. et al., "Cost estimation of custom hoses from STL files and CAD drawings," Computers in Industry, vol. 64, No. 3, pp. 299-309 (2013).

Non-Final Office Action dated Feb. 12, 2018 for U.S. Appl. No. 15/721,208, 7 pages.

Non-Final Office Action dated Nov. 21, 2018 for U.S. Appl. No. 15/340,338, 7 pages.

Non-Final Office Action dated Dec. 4, 2018 for U.S. Appl. No. 16/113,835, 8 pages.

Shtub et al.; "A neural-network-based approach for estimating the cost of assembly systems"; Int'l Journal of Production Economics; vol. 32; 1993; p. 189-207.

Zhang et al.; "A Neural Network Approach for Early Cost Estimation of Packaging Products" Computers in Industrial Engineering; vol. 34; 1998; p. 433-450.

Boothroyd et al.; "Approximate Cost Estimates for Typical Turned Parts"; Journal of Manufacturing Systems; vol. 8; 1989; p. 185-193.

Feng et al.; "Cost evaluation in design with form features"; Computer-Aided Design; vol. 28; 1996; p. 879-885.

Wang et al.; "Cost model development using artificial neural networks"; Aircraft Engineering and Aerospace Technology; vol. 73; 2001; p. 536-541.

Joshi et al.; "Graph-based heuristics for recognition of machined features from a 3D solid model"; Computer-Aided Design; vol. 20; 1988; p. 58-66.

JJ Shah; Assessment of features technology; Computer-Aided Design; vol. 23; Jun. 1991; p. 331-343.

Henderson, Mark R.; "Extraction of Feature Information From Three-Dimensional CAD Data"; Thesis; Purdue University; 1984; 159 pages.

Kung, Hsiang-Kuan; "An Investigation Into the Development of Process Plans From Solid Geometric Modeling Representation"; Thesis; Oklahoma State University; 1984; 274 pages.

Yao et al.; "A Geometric Algorithm for Finding the Largest Milling Cutter"; Journal of Manufacturing Processes; vol. 3; 2001; 16 pages.

Vandenbrande et al.; "Spatial Reasoning for the Automatic Recognition of Machinable Features in Solid Models"; IEEE Transactions on Pattern Analysis and Machine Intelligence; vol. 15; Dec. 1993; p. 1269-1285.

De la Garza et al.; "Neural networks versus parameter-based applications in cost estimating"; Cost Engineering; vol. 37; Feb. 1995; p. 14-18.

Kyprianou LK; "Shape classification in computer-aided design"; Thesis; University of Cambridge; 1982; (abstract only).

* cited by examiner

METHODS AND APPARATUS FOR MACHINE LEARNING PREDICTIONS OF MANUFACTURING PROCESSES

CROSS-REFERENCE TO RELATED PATENT APPLICATIONS

This application is a Continuation of, and claims priority to, and benefit of U.S. patent application Ser. No. 16/113,835 filed on Aug. 27, 2018 and entitled "METHODS AND APPARATUS FOR MACHINE LEARNING PREDICTIONS AND MULTI-OBJECTIVE OPTIMIZATION OF MANUFACTURING PROCESS", and issued as U.S. Pat. No. 10,338,565 which is a continuation of U.S. patent application Ser. No. 15/721,208 filed on Sep. 29, 2017, and issued as U.S. Pat. No. 10,061,300, the entire contents of which is hereby incorporated by reference.

This application is also related to U.S. patent application Ser. No. 15/340,338, filed on Nov. 1, 2016, and entitled "Methods and Apparatus for Machine Learning Predictions of Manufacture Processes," and issued as U.S. Pat. No. 10,281,902 (and related to applications continuing therefrom, including Ser. Nos. 16/046,519 and 16/395,940, respectively issued as U.S. Pat. Nos. 10,274,933 and 10,558,195) the entire content of which is hereby incorporated by reference.

TECHNICAL FIELD

The present disclosure relates generally to manufacture processes, and more particularly to the processing of digital models for manufacture processes through machine learning and artificial intelligence techniques.

BACKGROUND

Often, product manufacturers receive customer orders specified in electronic files including Computer Assisted Design (CAD) models. A need exists for methods and apparatus to support the prediction of appraisals and production alternatives related to manufactured products, including times, manufacture methods, and costs incurred in manufacture processes. Many manufacture companies rely on human experience alone or have no standardized methodologies to predict appraisals and other aspects associated with the manufacture of products. Relying on human experience alone can result in inaccurate predictions and can lead to inconsistencies across appraisals and other predictions made by different human estimators with respect to similar or identical products. Moreover, the lack of reliable objective manufacture appraisal or predictive tools can prohibit the optimization of manufacturing processes when such processes are executed for a first time and/or the conditions in which such manufacturing processes were executed change over time.

Thus, a need exists for methods and apparatus for reliable manufacture analysis tools to accurately predict aspects associated with the production of products specified in CAD or other digital-based models that can vary over time or can depend on exogenous variables.

SUMMARY

The subject technology is related to methods and apparatus for training a set of regression machine learning models with a training set to produce a set of predictive values for a pending manufacturing request, the training set including data extracted from a set of manufacturing transactions submitted by a set of entities of a supply chain. A multi-objective optimization model is implemented to (1) receive an input including the set of predictive values and a set of features of a physical object, and (2) generate an output with a set of attributes associated with a manufacture of the physical object in response to receiving the input, the output complying with a multi-objective condition satisfied in the multi-objective optimization model.

DETAILED DESCRIPTION

Figure 1:
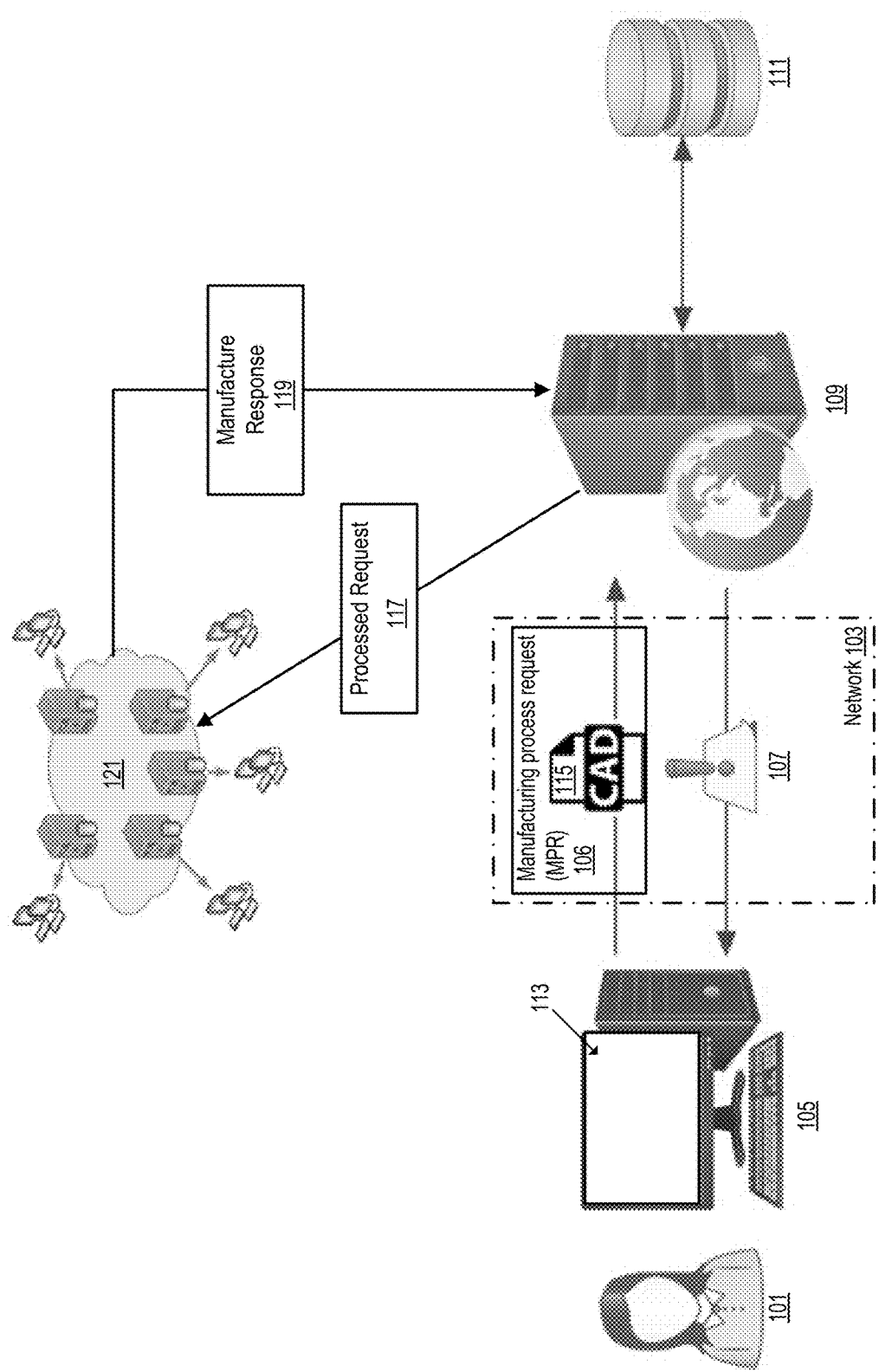
FIG. 1 is a schematic diagram of a predictive system for manufacture processes operatively coupled to a client compute device, according to an embodiment.

At least one embodiment described herein includes an apparatus with a processor, and a memory storing instructions which, when executed by the processor, causes the processor to receive manufacturing process requests with a digital model representative of a physical object. The apparatus determines from the digital model a non-empty set of features associated with the physical object. Thereafter, the apparatus produces a first predictive value for the manufacturing process request based at least on a first regression machine learning model and the non-empty set of features associated with the physical object and a second predictive value for the manufacturing process request based at least on a second regression machine learning model and the non-empty set of features associated with the physical object. The apparatus generates a non-deterministic response including a non-empty set of attributes associated with a manufacture process of the physical object based at least on the first predictive value, the second predictive value, and a multi-objective optimization model. The non-deterministic response complies or satisfies a selected multi-objective condition included in the multi-objective optimization model.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. It, however, will be clear and apparent that the subject technology is not limited to the specific details set forth herein and may be practiced without these specific details. In some instances, well-known structures and components are shown in block diagram form to avoid obscuring the concepts of the subject technology.

The terms "computer", "processor", "computer processor", "compute device" or the like should be expansively construed to cover any kind of electronic device with data processing capabilities including, by way of non-limiting example, a general processor, a graphics processing unit (GPU), a digital signal processor (DSP), a microcontroller, a field programmable gate array (FPGA), an application specific integrated circuit (ASIC), or any other electronic computing device comprising one or more processors of any kind, or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

The subject technology provides objective, accurate, and consistent classifications and/or predictions regarding manufacturing processes, including estimated times, optimal costs, comparisons of fabrication materials, and other suitable information. The classifications and/or predictions are reliable; that is, assessments for the manufacture of similar products result in similar or equivalent outcomes. The subject technology operates in near real-time and thus, optimizes manufacturing process by decreasing overhead associated with human-based estimations.

FIG. 1 is a schematic diagram of a predictive system for manufacture processes operatively coupled to a client compute device, according to an embodiment. Such a Predictive System for Manufacture Processes (hereinafter PSMP) server 109 can provide predictions or estimations in near real-time regarding manufacturing processes associated with a physical object, for example, a mechanical part, an ornament, an electronic device, or other suitable physical object conveyed in an electronic file such as a CAD file, a scanned copy of a model drafted by hand, and/or other electronic files graphically describing a model of a physical object. In some instances, a local user (not shown in FIG. 1) can connect directly to the PSMP system 109; in other instances a remote user 101 can connect to the PSMP system via a network, for example, network 103.

Network 103 can include one or more types of communication networks. For example communication networks can include, the Internet, a local area network (LAN), a wide area network (WAN), a metropolitan area network (MAN), various types of telephone networks (including, for example, Public Switch Telephone Network (PSTN) with Digital Subscriber Line (DSL) technology) or mobile networks (including for example Global System Mobile (GSM) communication, General Packet Radio Service (GPRS), Code Division Multiple Access (CDMA), and other suitable mobile network technologies), or any combination thereof. Communication within the network can be realized through any suitable connection (including wired or wireless) and communication technology or standard (wireless fidelity (WiFi®), 4G, long-term evolution (LTE™), or other suitable standard).

Compute device 105 can be configured with one or more computer processors and a computer memory (including transitory computer memory and/or non-transitory computer memory), configured to perform various data processing operations. Compute device 105 also includes a network communication interface (not shown) to connect to PSMP server 109 via network 103 and other suitable electronic components. Examples devices represented by compute device 105 can include a personal computer, portable computer, smartphone, tablet, notepad, dedicated server computer devices, any type of communication device, and/or other suitable compute devices. As described in further detail herein, in some instances, compute device 105 can be connected to network 103 via an intranet, an Internet Service Provider (ISP) and the Internet, a cellular network, and/or other suitable network communication technology.

PSMP server 109 can include one or more computer processors and computer memories (including transitory computer memory and/or non-transitory computer memory), which are configured to perform various data processing and communication operations associated with prediction and estimation of manufacture process of physical objects. In general, PSMP server 109 receives and processes Manufacturing Process Requests (MPR) 106 received from compute device 105. Further components of PSMP server 109 are discussed with reference to FIG. 2.

In some implementations, storage device 111 can be physically integrated to PSMP server 109; in other implementations, storage device 111 can be a repository such as a Network-Attached Storage (NAS) device, an array of hard-disks, a storage server or other suitable repository separate from PSMP server 109. In some instances, storage device 111 can include trained machine-learning models configured to predict manufacture appraisals, processes, and/or events; such machine-learning models are trained with data collected over time to optimize one or more machine learning models after deployment. Storage device 111 can also include sets of computer executable instructions to apply multi-objective optimizations and symbolic regressions over parameters or attributes calculated from digital models, datasets with grounded axioms generated through estimations or predictions derived from digital model, profiles of multiple entities of a supply chain, and other suitable type of executable-instructions and data associated with the manufacture of a physical object.

In some instances, user 101 can access the services provided by PSMP server 109 through compute device 105 by, for example, entering on a web browser a Uniform Resource Locator (URL) corresponding to a domain hosted by PSMP server 109. Accordingly, a web page with GUI 113 is displayed on compute device 105. User 101 can send a MPR 106 to PSMP server 109 via network 103 with one or more prediction requests associated with the manufacture of a physical object represented in a digital format within CAD file 115. Upon reception of MPR 106, PSMP server 109 executes one or more processes depending on requests submitted by user 101. In some instances, PSMP server 109 can fetch or retrieve one or more data structures, executable machine-learning models, and other suitable data and/or executable instructions from a knowledge base stored in storage device 111. Accordingly, PSMP server 109 processes MPR 106 and sends processed request 117 to one or more entities of a supply chain coupled to computer network 121. PSMP server receives manufacturing response 119 confirming, and/or rejecting processed request 117. In some instances, based on manufacture response 119, and multi-objective optimization process discussed below PSMP 109 sends prediction report 107 to compute device 105 via network 103 in near real-time. Prediction report 107 can include a non-deterministic response with a set of attributes associated with the manufacture of the physical object represented CAD file 115 as further discussed with reference to FIG. 12.

Figure 7:
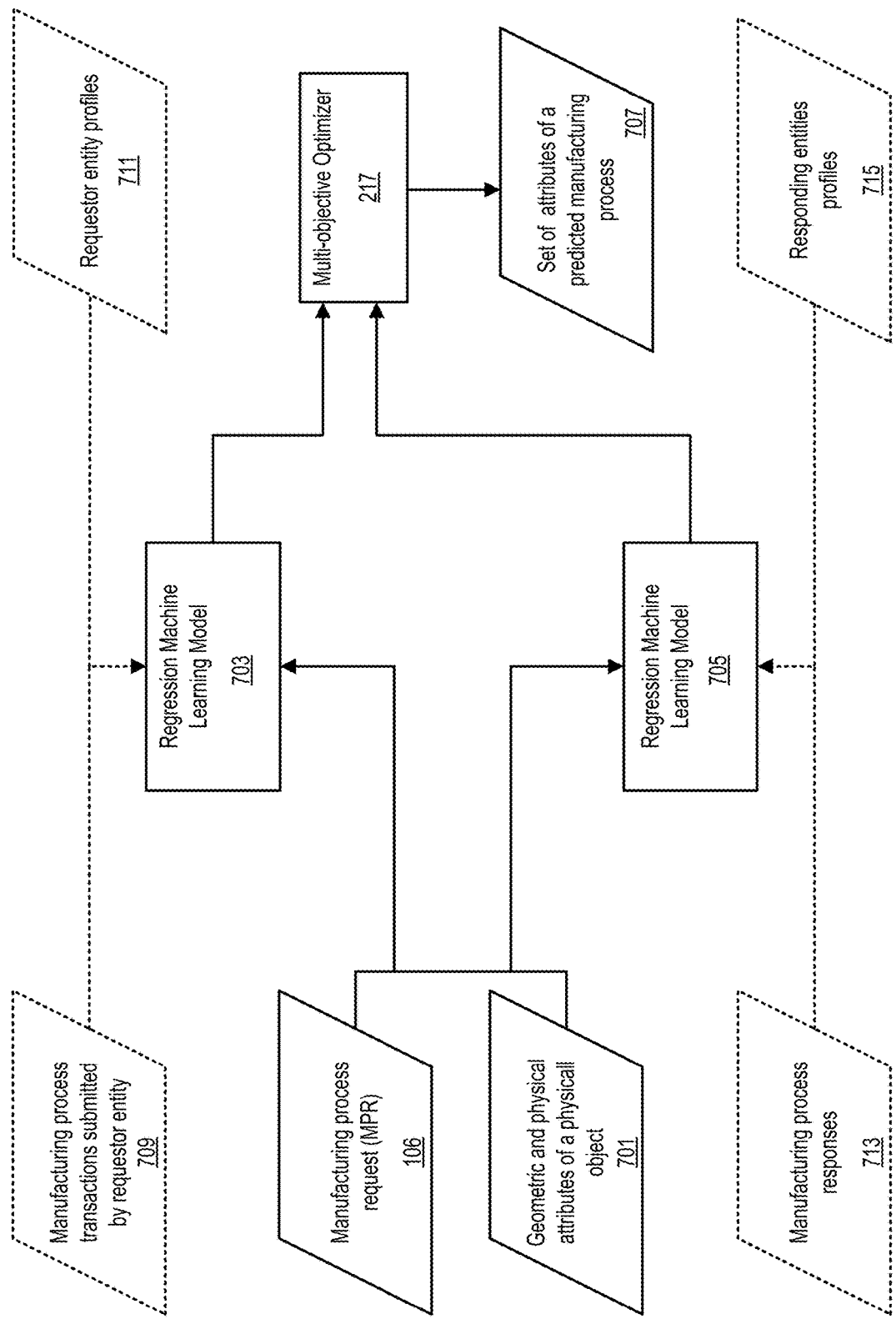
FIG. 7 is a flowchart illustrating an example of a method to generate a non-deterministic response including a set of attributes and/or axioms for the manufacture of a physical object.
Figure 8:
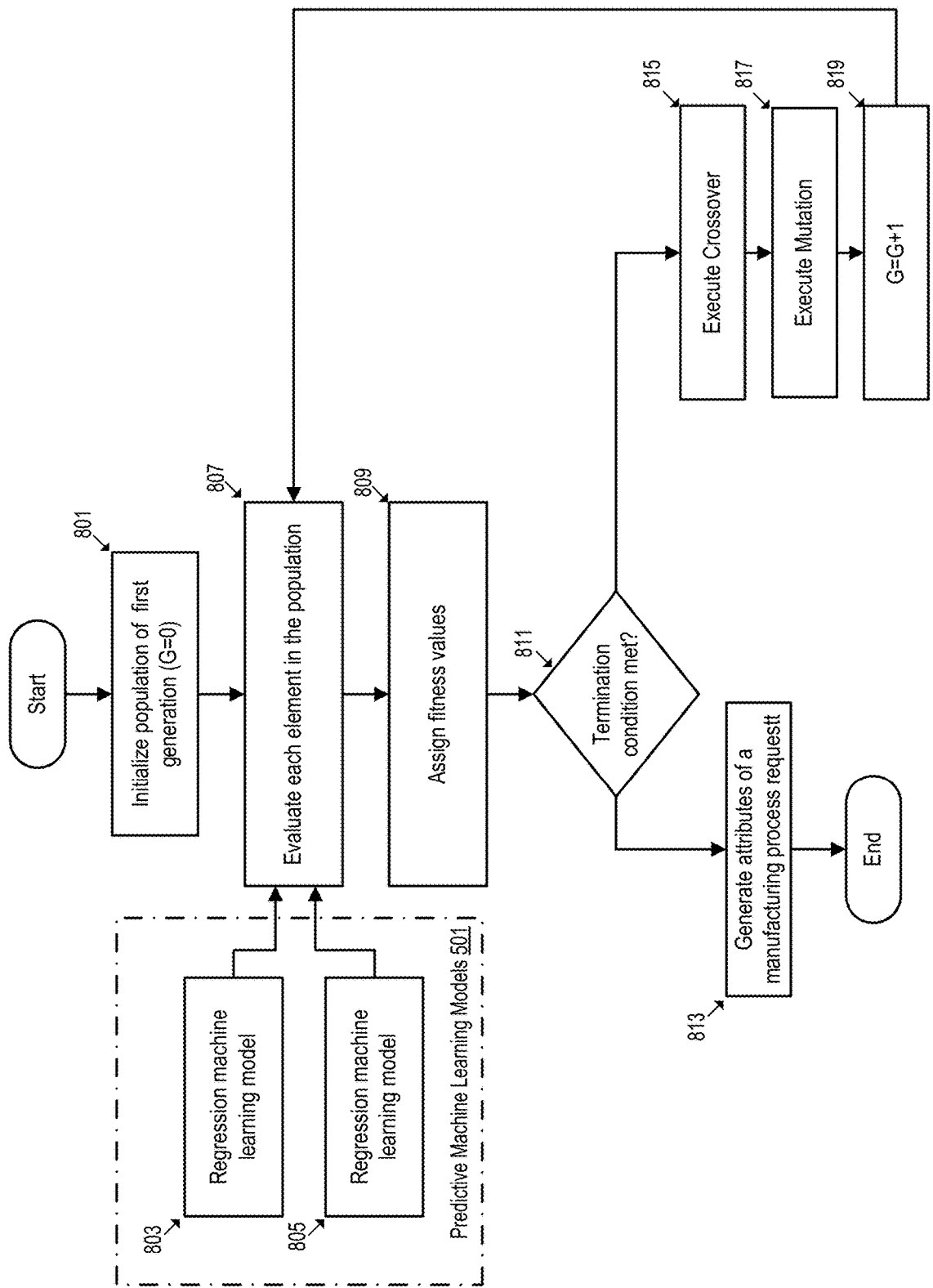
FIG. 8 is a flowchart illustrating an example of a method to implement an evolutionary model of a predictive system for manufacture processes, according to an embodiment.

The response included in prediction report 107 can be considered non-deterministic because it can include outputs produced based on probabilistic inputs processed by, for example, regression machine learning models, multi-objective optimizer, and other suitable models discussed, for example, with reference to FIG. 7 and FIG. 8. Differently stated, one or more machine-learning models implemented by a PSMP server 109 can learn non-deterministic real-world properties based on incomplete training sets, in addition to deterministic properties (e.g., physical or geometric properties processed from, for example, a collection of CAD files such as 115). Unlike systems developed to operate in linear or deterministic domains or environments, for which strict determinism is desired (i.e., it is desired that such systems produce the very same output when given the same input no matter how many times the systems runs), that strict determinism can be undesirable in systems that have non-deterministic and/or incomplete inputs. Moreover, such a type of strict determinism assumes that a system already contains all the knowledge affecting an environment or domain. Thus, deterministic or linear systems can produce sub-optimal results when unknown, exogenous, and/or unseen conditions change.

Figure 2:
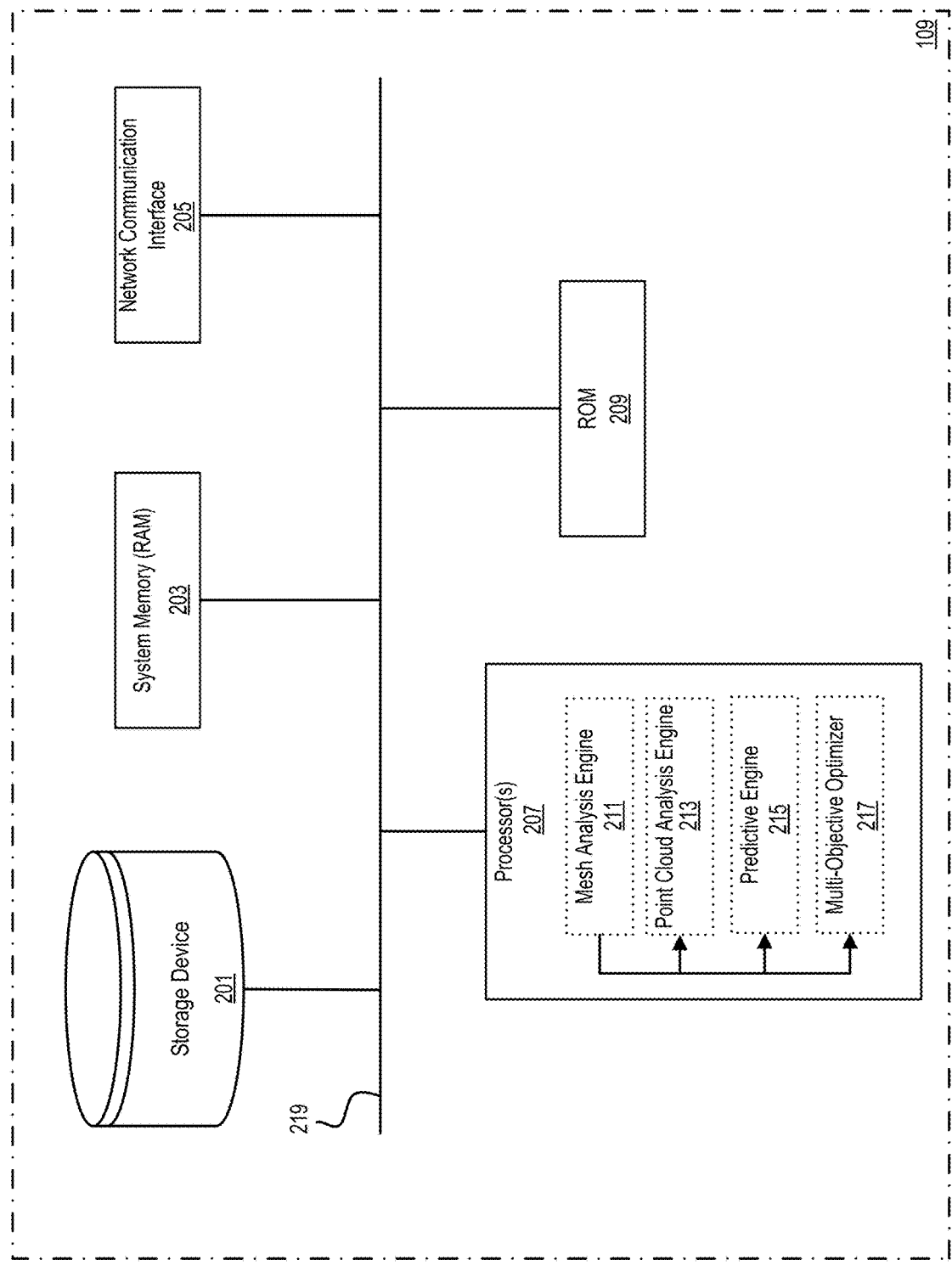
FIG. 2 is a schematic block diagram illustrating a predictive storage device, a mesh analysis engine, a point cloud analysis engine, a predictive engine, a multi-objective optimizer, memories, and a network communication interface of a predictive system for manufacture processes, according to an embodiment.

FIG. 2 is a schematic block diagram illustrating a predictive storage device, a mesh analysis engine, a point cloud analysis engine, a symbolic regression engine, a predictive engine, memories, and a network communication interface included in PSMP server 109 according to an embodiment. In some implementations, PSMP server 109 can be a compute device, such as a hardware platform server configured to support mobile applications, Software as a Service (SaaS) applications, a web site, and/or other suitable applications accessible to client compute device 105 in FIG. 1.

The bus 219 collectively represents system peripheral and/or chipset buses that communicatively connect numerous internal devices of the PSMP server 109. For instance, bus 219 communicatively couples processor 207 with read-only memory 209, system memory (RAM) 203, and storage device 201. From these various memory units, processor 207 can retrieve instructions to execute and/or data to perform processes for discretization, manufacturability analysis, optimization and predictions associated with manufacturing process. In some implementations, processor 207 can be a single processor, a multi-core processor, a master-slave processor arrangement, or other suitable compute processing device. In some implementations, processor 207 can be any suitable processor such as, for example, a general purpose processor, a field programmable gate array (FPGA), an application specific integrated circuit (ASIC), graphics processing unit, and/or other suitable hardware device.

Figure 3:
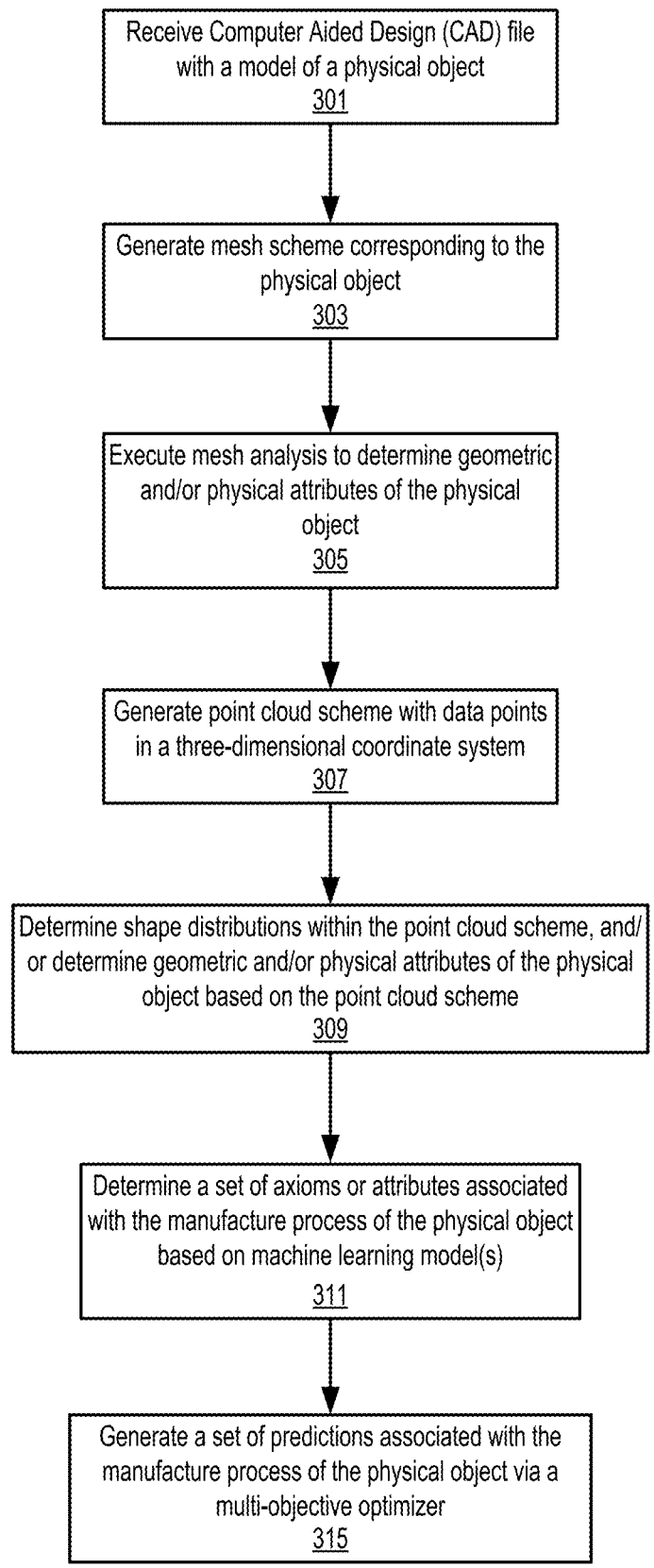
FIG. 3 is a flowchart illustrating a method to generate a set of predictions associated with manufacture processes of a physical object, according to an embodiment.

PSMP server 109 can further include physical compute devices not shown in FIG. 3 (e.g., load balancer device, cluster of messaging servers and cluster of RTC servers) residing at a particular location or deployed in a cloud computing network environment. A cloud computing network environment enables ubiquitous, convenient, on-demand network access to a shared pool of configurable compute resources (e.g., networks, servers, storage, applications, and services) that can be rapidly provisioned via, for instance, virtualization and released with minimal management effort or service provider interaction, and then scaled accordingly. A cloud model can be composed of various characteristics (e.g., on demand self-service, broad network access, resource pooling, rapid elasticity, and measured service), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.)

In some implementations, PSMP server 109 can include any combination of one or more computer-usable or computer-readable media. For example, PSMP server 109 can contain computer-readable medium including system memory or random access memory (RAM) device 203, a read-only memory (ROM) device 209, a storage device 201 and other suitable memory devices. In some implementations, PSMP server 109 can include a general purpose processor and/or one or more specialized processors configured to execute and optimize the processing tasks performed by mesh analysis engine 211, point cloud analysis engine 213, predictive engine 215, multi-objective optimizer 217, and other processes executed by processor 207.

Mesh analysis engine 211, point cloud analysis engine 213, predictive engine 215, and multi-objective optimizer 217 can be implemented as hardware, software and/or a combination of hardware and software. For example, storage device 201 (or other suitable memory coupled to processor 207 or PSMP server 109) can include processor-executable instructions and/or data to configure processor 207 to execute the tasks performed by engines 211, 213, 215, and 217. In some implementations, storage device 201 can be structurally and functionally analogous to storage device 111 shown in FIG. 1. Accordingly, in some instances, processor 207 can retrieve processor executable instructions and data to execute various PSMP processes from one or more of the memory units shown in FIG. 2.

In some implementations, mesh analysis engine 211 executes discretization processes of digital models and computations of geometrical and physical properties of a physical object represented by the digital model. For example, mesh analysis engine 211 can compute and/or process data corresponding to a discretized version a digital model. Such a discretized version includes explicit surface representations of a digital model defined as a continuous piecewise linear surface composed by simplicial elements, for instance, triangles, polygons, and other suitable simplicial elements. Mesh analysis engine 211 includes computer executable instructions to calculate geometric and physical properties associated with a digital model including but not limited to, Euler characteristics (i.e., vertices, edges, and faces), oriented bounding box, center of mass, curvature estimation, symmetry, and other suitable properties. In some implementations, mesh analysis engine 211 includes processor executable instructions for discretization of digital models having arbitrary shapes and processor executable instructions to determine attributes from such discretized representations of digital models. Further details with respect to mesh analysis engine 211 are discussed with reference to FIG. 3.

In some implementations, point cloud analysis engine 213 computes a three dimensional (3D) point cloud of a digital model and calculates geometrical and physical properties of a physical object derived from such a point cloud. For example, point cloud analysis engine 213 can instantiate and process a data structure with a set of 3D coordinates representing the digital model (i.e., point cloud). Some data structures to define point clouds include vectors of values with unique indexes corresponding to each point, octrees, and/or other suitable data structures. Such a set of 3D coordinates defines a point cloud corresponding to the digital model.

In some implementations, point cloud analysis engine 213 executes one or more processes to calculate implicit or volumetric properties of a digital model from a point cloud. Such processes include but are not limited to processes based on functions to determine continuous algebraic surfaces, radial basis processes, functions to define discrete voxelizations of a digital model (i.e., discretization of a 3D digital model into discrete elements of volume that constitute a 3D space corresponding to a physical object), and other suitable implicit and volumetric functions. In some further implementations, point cloud analysis engine 213 includes computer executable instructions to calculate geometric and physical properties associated with a digital model including but not limited to, symmetric and asymmetric properties of a physical object represented in the digital model, distances between surfaces of a physical object represented in the digital model, and other suitable properties. In some further implementations, cloud point analysis engine 213 includes processor executable instructions for defining implicit or volumetric representations of 3D models having arbitrary geometric shapes and processor executable instructions for determining attributes from such implicit or volumetric representations. Further details with respect to point cloud analysis engine 213 are discussed with reference to FIG. 3.

In some implementations, multi-objective optimizer 217 processes a set of symbolic functions determined based on evolutionary computation models trained with samples including a representative collection of digital models of a domain of mechanical parts, products, or other suitable physical objects. Such a set of symbolic functions can be stored in a corresponding set of data structures and/or processor-executable instructions in a local memory or other memory operationally coupled to multi-objective optimizer 217.

In some implementations, multi-objective optimizer 217 can implement a multi-objective optimization model based on an evolutionary computation including, for instance, a genetic algorithm, genetic programming technique, evolutionary programming technique, differential evolution technique or other suitable evolutionary computation model. Multi-objective optimizer 217 can produce a symbolic mathematical expression or parametric function to determine one or more optimized attributes associated with a manufacturing process.

Accordingly, in some implementations, multi-objective optimizer 217 can determine functional forms and/or approximations of targeted functions, describing attributes of a manufacturing process, and physical and/or geometric attributes of a physical object represented in a digital model. For example, multi-objective optimizer 217 can determine polynomial terms, cross terms, transcendental functions, and other suitable symbolic function elements to identify shapes of a digital model, and attributes associated with the fulfillment of a manufacturing process request.

In some instances, when a matching error rate between, for example, mesh scheme attributes and a set of symbolic functions retrieved from memory reaches a predetermined threshold, multi-objective optimizer 217 can execute one or more processes to retrain evolutionary computation models such that the matching error rate is decreased to an acceptable level. Accordingly, multi-objective optimizer. 217 can adapt or learn while in production after analyzing values of datasets that are substantially different from values of datasets used as training sets of the evolutionary model. In some instances, complex physical attributes can be generated based directly on data provided in a digital model, or data generated by another engine (for example mesh analysis engine 211 and/or point cloud analysis engine 213), via evolutionary computation models included in multi-objective optimizer 217. Further details with respect to multi-objective optimizer 217 are discussed with reference to FIG. 7, FIG. 8, and FIG. 9.

Predictive engine 215 includes a set of trained machine-learning models and other suitable computation models to infer axioms regarding a physical object represented in a digital model and likelihood or probabilities associated with entities of a supply chain predicted for a manufacturing process request. Predictive engine 215 can take as input one or more attributes included in a manufacturing process request such as number of requested parts, previous manufacturing transactions committed by a requesting entity, time when a request is expected to be fulfilled and other suitable data extracted or derived from a manufacturing process request. Likewise, predictive engine 215 can receive inputs derived or extracted from a digital model included in a manufacturing process requests; attributes or parameters generated by the mesh analysis machine engine 211; and/or attributes or parameters generated by the point cloud analysis engine 213, and/or symbolic regression engine 215. Thus, in some instances, predictive engine 215 can infer axioms to determine predictions by processing outputs generated by one or more of mesh analysis engine 211, point cloud engine 213, multi-objective optimizer 217, and/or data included in the electronic file with the digital object. Predictive engine 215 also includes a knowledge aggregator and reasoning engine (not shown in FIG. 2) that process inferred axioms to determine predictions associated with the manufacture process of a physical object represented in a digital model. Further details of predictive engine 215 are discussed with reference to FIG. 6 and FIG. 11.

Bus 219 can also couple PSMP server 109 to network 103 shown in FIG. 1 through a network communication interface 205. Network communication interface 205 can include one or more wireless transceivers for performing wireless communication and/or one or more communication ports for performing wired communication. In some implementations, network communication interface 205 can be configured to transmit digital prediction reports in response to requests of manufacture processes prediction reports sent by remote compute devices. In this manner, PSMP server 109 can be part of a network of computers (for example a local area network ("LAN"), a wide area network ("WAN"), an intranet, or a network of networks, for example the Internet.

In some implementations, PSMP server 109 includes an output device interface not shown in FIG. 2, for example, printers, audio devices (e.g., speakers), haptic output devices, and display devices (e.g., cathode ray tubes (CRT), liquid crystal displays (LCD), gas plasma displays, touch screen monitors, capacitive touchscreen and/or other suitable display device). Some implementations include devices that function as both input and output devices (e.g., a touchscreen display). Accordingly, a user can submit prediction requests directly to PSMP server 109 with no need of network 103.

FIG. 3 is a flowchart illustrating a method to generate a set of predictions associated with manufacture processes of a physical object, according to an embodiment. A PSMP server (e.g., PSMP server 109 shown in FIG. 1 and FIG. 2) can receive a CAD file or other suitable electronic file with a design of a physical model at 301. In some instances, a CAD file or other suitable electronic file can include data points corresponding to a mesh scheme of the digital model. Thus, the PSMP server can extract the mesh scheme data points from the electronic file. In some other instances, when preprocessed data specifying such a mesh scheme is not included in the electronic file, the PSMP server can execute one or more processes to generate a mesh scheme of the digital model at 303 as discussed above with reference to mesh analysis engine 211 shown in FIG. 2.

In some instances, a mesh scheme can include data structures containing information related to shared vertices in a table of vertices. Such data structures encode simplicial elements as sets of n-tuples, for example, triangles encoded as triples of indices into the table of vertices. A mesh scheme can further include one or more processes for local and global traversal of a mesh including: 1) processes to access individual vertices, edges, and faces; 2) processes to determine a next edge in a face, also known as degree of a face and inverse operation for a previous half-edge; 3) processes to access faces attached to an edge; 4) processes to determine starting and/or ending vertices of an edge; and other suitable processes.

Some specific data structures to implement a mesh scheme include directed-edge, winged-edge, quad-edge, half-edge, and other suitable data structures. These data structures are example data structures that can be used interchangeably to define mesh schemes; thus, they are not intended to suggest any limitation as to the scope of use and/or functionality of the presently disclosed subject matter. Further details regarding examples of half-edge data structures and directed-edge data structures are discussed below.

A half-edge data structure can include a set of half-edge structures. Each half-edge structure contains data values corresponding to a vertex pointed by the half-edge, adjacent faces, pointer to a next half-edge, pointer to an inverse or opposite half-edge, previous half-edge, and other suitable data fields and substructures. In some instances, the implementation of such half-edge structures can be implemented by using pointers, and/or indices stored in arrays for an efficient memory allocation.

A directed-edge data structure can include indices as references to mesh elements e.g., vertices, faces, half-edges, and other suitable elements. Indices of directed-edge structures can be defined by a set of rules such that the structures implicitly encode connectivity information of simplicial elements of a mesh. To be more specific, indices corresponding to half-edges of a triangular face can be given by:

$$\text{halfedge}(f,i)=3f+1, i=0,1,2 \quad (1)$$

where f is the index corresponding to a triangular face. Then, an index of an adjacent face and its index within that face are given by:

$$\text{face}(h)=h/3 \quad (2)$$

where h is an index of a half-edge.

An instance of a mesh is analyzed at 305 to determine physical and/or geometric attributes of the physical model represented in an electronic file. Example of attributes calculated from a mesh scheme include a data value corresponding to a volume of the physical object, data values corresponding to a surface areas of the physical object, 3-tuple data structures including a length value, a width value, and a height value associated with a prism or bounding box enclosing the digital model, 3-tuple data structures with coordinate data values of a center of the prism, data values corresponding to volume of convex hulls enclosing digital models, data values corresponding to moments of inertia of physical objects, data values corresponding to surface areas of a physical object associated with a computer numerical control machine operation, data values corresponding to non-planar surface areas associated with the physical object, data values corresponding to the number of manufacture tools directions associated with a physical object, data values corresponding to a number of holes associated with a physical object, a data value corresponding to a determination of whether or not a digital model specifies a well-defined shape, and other suitable attributes.

In some implementations, one or more attributes of the physical object produced at 305 are used at 307 to model or generate a point cloud scheme defined by data points in a three-dimensional coordinate system. Such a point cloud scheme is generated for example, by point cloud analysis engine 213 discussed with reference to FIG. 2. In general, a point cloud scheme defines a digital model as a collection of 3D coordinates. Point cloud analysis engine 213 can determine attributes of a physical object based on implicit or volumetric properties derived from a point cloud generated from data included in a digital model, or data generated by another engine, for example, mesh analysis engine 211.

In some implementations, a point cloud scheme generated at 307 can classify each 3D point of an embedding space of solid objects of a digital model. Each 3D point can be flagged with a value indicating whether the point lays either inside, outside, or exactly on the surface bounding a solid object. Generation of point cloud scheme can include processes for downsampling, denoising, merging, estimation of normal, and other suitable point cloud processing functionalities.

At 309, a set of 3D shape distributions are determined from the point cloud scheme generated at 307. A 3D shape distribution can be defined as a unique or signature shape sampled from a shape function. In some implementations, shape distributions can be defined as a function of distance(s) between two random points laying on a surface of a digital model. More specifically, a shape distribution can be defined as a set of histograms of distances between random sample of point cloud points, broken down by Euclidean distance and normal distance, full histograms, interior distances, exterior distances, and any combination of distances thereof.

In some instances, geometric, physical, and other suitable properties or attributes of a digital model can be calculated at 309 from functions defining the set of shape distributions of a point cloud scheme. Examples of such geometric and physical attributes include an axial symmetry of a convex hull generated to enclose the digital model, a data value associated with an axial symmetry of a shape defined based on a difference between the convex hull and the digital object, and other suitable geometric or physical attributes of the physical object represented in the digital model. The computational load of the PSMP server can be advantageously minimized (or reduced) by comparing probabilities of distributions, instead of alternative shape matching methods requiring pose registration, feature correspondence, model fitting, and/or other expensive functions. In some instances, dissimilarities between sampled distributions of shape functions can be used to discriminate between different physical objects represented in a physical model.

In some implementations, the mesh scheme generated at 303, mesh analysis performed at 305, the point cloud scheme generated at 307, point cloud analysis performed at 309, and other suitable data structures and processes can be implemented using one or more commercial or public mesh and point cloud processing libraries including, for example, Computational Geometric Algorithms Library™ (CGAL), OpenMesh™, Wolfram Mathematica™, MathWorks Matlab™, and other libraries and/or tools for generating and processing mesh schemes. For example Wolfram Mathematica™ includes libraries to compute discretization of two dimensional and three dimensional graphics to mesh-based regions, compute convex hull of a given set of points, compute a distance to a nearest point in a mesh and other suitable functions for discretization and analysis of mesh schemes. For another example Matlab™ includes a 3D point cloud processing toolbox with functions to read, write, and store point clouds and other point cloud operations and utilities In some implementations, a collection of shape distributions can be stored in the storage device 111 shown with reference to FIG. 1 and FIG. 2 or other suitable memory repository. Accordingly, a set of candidate shape distributions can be retrieved on demand, or in near real-time as pre-classifiers of shapes in a digital model and can be used as input to predictive engine 215 shown with reference to FIG. 2.

At 311, a set of axioms or attributes associated with the manufacture process of a physical object represented in a digital model is determined. PSMP server 109, for example, can rely on machine-learning models implemented in predictive engine 215 discussed above with reference to FIG. 2. In some implementations, machine-learning models can take as input any of the outputs generated by mesh analysis engine 211 produced at 305, point cloud analysis engine 213 produced at 307, multi-objective optimizer 217, a Boundary Representation (BREP) system and/or data included in a manufacturing process request or in the electronic file with the digital model.

At 315, a set of predictions associated with the manufacture process of a physical object is generated. As discussed above, such predictions can be generated by predictive engine 217 with reference to FIG. 2. Such a set of predictions can be derived from any of the outputs generated by mesh analysis engine 211, point cloud analysis engine 213, multi-objective optimizer 217, any of the axioms determined at 311, data included in manufacturing process request 106 (shown in FIG. 1), the electronic file with the digital model e.g., CAD file 115 (also shown in FIG. 1), and/or any combination thereof.

Figure 4:
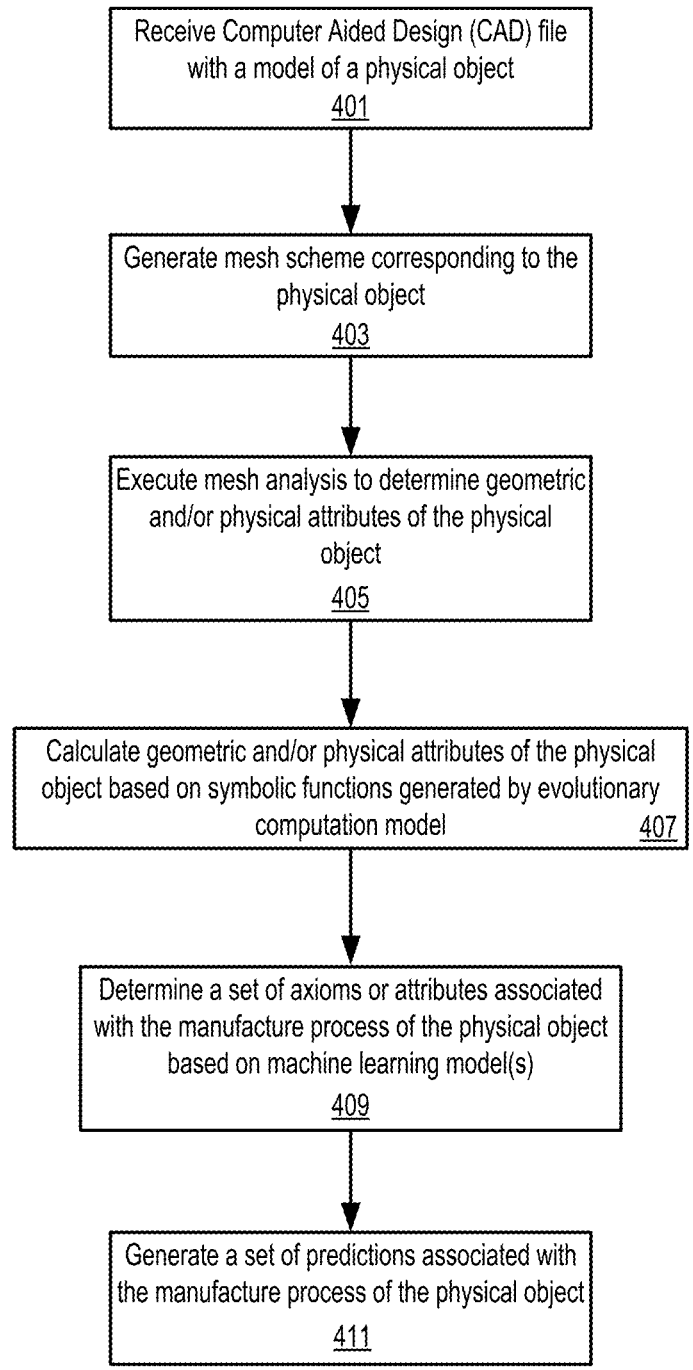
FIG. 4 is a flowchart illustrating a method to generate a set of predictions associated with manufacture processes of a physical object, according to another embodiment.

FIG. 4 is a flowchart illustrating a method to generate a set of predictions associated with manufacture processes of a physical object, according to another embodiment. The method illustrated in FIG. 4 is in some aspects, functionally similar to the method discussed with reference to FIG. 3. For example, the operations performed at 301, 303, 305, 311, and 315 discussed with reference to FIG. 3 are also executed in the method illustrated in FIG. 4. In FIG. 4 however, a PSMP server (e.g., PSMP server 109 shown in FIG. 1) can calculate geometric and/or physical attributes at 407 from a digital model based on multi-objective optimizers generated by evolutionary computation models in conjunction with symbolic regression. As discussed above, these operations can be executed at multi-objective optimizer 217 shown in FIG. 2.

In this instance, multi-objective optimizer 217 receives geometric and/or physical attributes corresponding to a physical object generated at 305 mesh scheme generated at 303, and/or data extracted from manufacturing process request 106 (shown in FIG. 1). Thereafter, a matching process between targeted functions and parametric functions is executed and a set of expressions in a functional form is determined. Such a set of expressions can be optimized by multi-objective optimizer 217 according to a multi-objective condition. The PSMP server can determine sample data points, geometrical and/or physical attributes including implicit attributes, volumetric attributes and other suitable physical and geometric attributes from a digital model based on the determined set of parametric functions or expressions. The PSMP server then uses the attributes determined at 407 as inputs for machine learning models executed at 311. Further discussion of the application of evolutionary models in conjunction with symbolic regression processes are provided with reference to FIG. 8 and FIG. 9.

Figure 5:
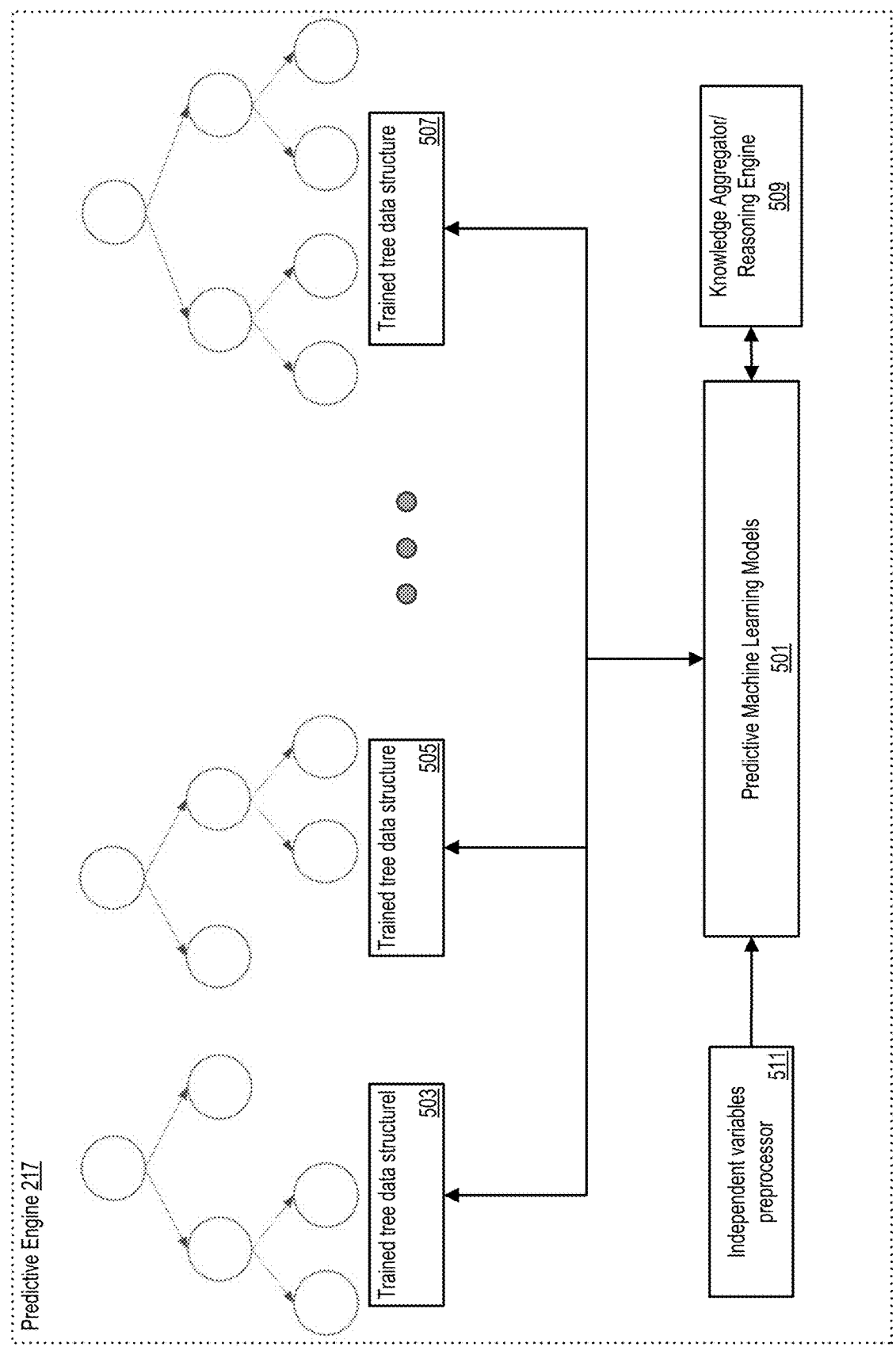
FIG. 5 is a schematic block diagram illustrating components of a predictive engine in a predictive system for manufacture processes, according to an embodiment.

FIG. 5 is a schematic block diagram illustrating examples of machine learning models implemented by a predictive engine in a predictive system for manufacture processes, according to an embodiment. In some implementations, predictive engine 217 includes independent variables preprocessor 511; predictive machine learning models 501; data structures for the application of prediction models, for example, trained tree data structures 503, 505, and 507; and knowledge aggregator and reasoning engine 509.

Independent variables preprocessor 511 performs several operations over datasets generated from mesh analysis engine 211, point cloud analysis engine 213, and/or multi-objective optimizer engine 217 (shown in FIG. 2). Independent variable preprocessor 511 determines specific parameters, forms, and/or notations used for the operation of predictive machine learning models 501. Thus, operations performed by independent variables preprocessor 511 include, for example, centering, scaling, parsing, performing imputations over datasets, performing descriptive or inferential statistical analysis over datasets, and/or other suitable operations used to shape datasets to be used as inputs for predictive machine learning models Predictive machine learning models 501 include a collection of trained machine-learning models to generate a set of axioms associated with the manufacture process of a physical object. Data structures, rules, heuristics, and knowledge bases on which these learning models rely can change over time. Stated differently, machine learning models 501 adapt to new trends and insights identified after their deployment in a production environment. Thus, machine learning models 501 are not limited to the knowledge acquired during their training phase. Some insights from which machine learning models 501 keep learning include new market trends, new types or models of manufacture machines, unseen shapes not included in a training set, new entities of a supply chain (e.g., manufacturing shops entering a market), emerging manufacturing technologies, and other suitable insights associated with the manufacture of physical objects.

Predictive machine learning models 501 can include, for example, any of least squares regression models, logistic regression models, support vector machines models, stochastic gradient descent models, nearest neighbors classification and/or regression models, Gaussian process classification and/or regression models, neural network classification and/or regression models, ensemble methods models, sequential application models, random forest classifiers models, extremely randomized trees regression models, deep learning models, and/or other suitable machine learning models.

Trained tree data structures 503, 505, and 507 are each an example of data structures that can be used by predictive machine learning models 501. Specifically, in some implementations, trained tree data structures shown in FIG. 5 can be used by classifiers and/or regressors based on, for example, random forest machine learning models, extremely randomized trees machine learning models, logistic regression machine learning models, and/or other suitable machine learning models based on tree data structures.

In some implementations, machine learning models 501 are configured to implement random forest classifiers. Random forest classifiers include a collection of de-correlated decision trees used to classify, for example, types of CNC processes that can be used to manufacture a physical object and other suitable axioms associated with manufacture processes. Some examples of CNC processes that can be determined through random forest classifiers include milling processes, lathe processes, sheet metal processes, and other suitable manufacture processes.

Random forest classifiers can be implemented to determine fabrication technologies or types of machine(s) that can be used to manufacture a physical object, for instance, additive manufacturing machines, subtractive manufacturing machines, casting manufacturing machines, injection molding manufacturing machines, hybrid machines, and other suitable types of manufacturing machines. Examples of additive manufacturing machines include, selective laser sintering machines, manufacturing machines based on Poly-Jet technology, direct metal laser sintering machines, fused deposition modelling machines, binder jetting machines, stereolithographic machines, and other suitable additive manufacturing machines. Examples of subtractive manufacturing machines include CNC milling machines, CNC turning machines, laser cutting machines, waterjet cutting machines, sheet metal punching machines, sheet metal folding machines, wire electrical discharge machining (EDM) machines, and other suitable subtractive manufacturing machines.

Random forest classifiers can be implemented to determine types of fixtures used for the manufacturing of a physical object. For example, a random forest classifier can receive inputs obtained from a mesh of a digital model corresponding to the genus of the physical object, curvature measures of the physical object, aspect ratio of the physical object, or other suitable inputs to determine whether a parallel jaw vice, custom soft jaw vice, custom vacuum fixture, custom bolt down fixture, or other suitable fixture is used for the manufacture of a physical object.

Random forest classifiers rely on N number of de-correlated decision trees. For a given input, each of the N decision trees generates an axiom. In some instances, a final classification axiom is determined by calculating, for example, the mode of the set of axioms generated by the N decision trees, the average or other suitable descriptive statistic. Advantageously, random forest classifiers mitigate a bias-variance tradeoff characteristic of classifiers based on single decision trees. Bias is the error resulting from erroneous assumptions implied in a configuration of a machine learning algorithm. Variance is an error ranging from sensitivity to small fluctuations, which depends on datasets used during the training phase of a machine learning model. Random forest algorithms mitigate the bias-variance tradeoff through a bagging process in which noisy and unbiased models are averaged to generate a model with low variance. A further discussion regarding the implementation of predictive machine learning models based on random forest trees is provided with references to FIG. 9 and FIG. 10.

In some implementations, machine learning models 501 are configured to implement extremely randomized trees regressors and classifiers. Extremely randomized trees are built from a full learning sample in a top-down procedure, starting with the root node and adding, at each step, a new test at one of the terminal nodes of a partially developed tree. Several unpruned trees can be implemented in the extremely randomized trees machine learning model. In some implementations, such trees can be unpruned decision trees and/or regression trees. Nodes in extremely randomized trees are split according to random cut-points. Because of the randomization of cut-points, extremely randomized trees can produce classification and/or decision axioms faster than other standard types of tree structures. Examples of an splitting process for numerical attributes used in extremely randomized trees machine learning model are provided below:

Split a node(S)
Input: local learning subset S corresponding to the node to be split
Output: a split [a < ac] or nothing
- If Stop split(S) =TRUE then, return nothing.
- Otherwise select K attributes $\{a_1, \ldots, a_k\}$ among all non-constant (in S) candidate attributes;
- Draw K splits $\{s_1, \ldots, s_k\}$, where $s_i$ = Pick a random split(S, $a_i$ ), $\forall_i = 1, \ldots, K$;
- Return a split s* such that Score(s*, S) = $\max_{i=1,\ldots,k}$ Score($s_i$, S).
Pick a random split(S,a)
Inputs: a subset S and an attribute a
Output: a split
- Let $a^s_{max}$ and $a^s_{min}$ denote the maximal and minimal value of a in S;
- Draw a random cut-point $a^c$ uniformly in $[a^s_{min}, a^s_{max}]$;
- Return the split [a < ac].
Stop split(S)
Input: a subset S
Output: a boolean
- If $|S| < n_{min}$, then return TRUE;
- If all attributes are constant in S, then return TRUE;
- If the output is constant in S, then return TRUE;
- Otherwise, return FALSE.
where K is the number of attributes randomly selected at each node and $n_{min}$ is the minimum sample size for splitting a node.

The splitting process shown above is executed multiple times over a full learning sample to generate a machine learning model with N number of tree structures. In some instances, when a model based on extremely randomized trees is used to implement a classifier, axioms generated by each of the N trees are aggregated to reach a final axiom. Such a final axiom is determined based on a majority vote elicited from each of the N trees. In other implementations, when a model based on extremely randomized trees is used to implement a regressor, a final axiom can be determined by calculating an arithmetic average of the set of axioms generated by the N trees. Examples of machine learning models 501 based on extremely randomized trees include regressors to determine, for example, a probability that a manufacture process will be authorized by a requestor entity, and/or other suitable attributes associated with a manufacturing process. Further details regarding training processes of machine learning models 501 are discussed with reference to FIG. 6.

In some further implementations, machine learning models 501 are configured to implement logistic regression classifiers. Logistic regression models are a type of regression models where the dependent variables are categorical. The model of logistic regression is based on different assumptions (about the relationship between dependent and independent variables) from those of linear regression. The conditional distribution in a logistic regression model is a Bernoulli distribution, because the dependent variable is binary. Second, the predicted values are probabilities and are therefore restricted to (0,1) through the logistic distribution function because logistic regression predicts the probability of particular outcomes. Some of the axioms or attributes that can be generated by logistic regression classifiers can include for instance, whether an entity or a group or entities in a supply chain will authorized a manufacturing process at a given quote, physical or geometrical attributes of an object requested in a manufacturing process request and/or other suitable attributes.

The axioms generated by the machine learning models 501 can be specific or tailored to numerous fabrication materials including metals, plastics, and other suitable fabrication materials. Examples of metals include aluminum alloys, stainless steel alloys, steel alloys, brass/bronze alloys, copper alloys, nickel alloys, titanium alloys, magnesium and other suitable metals and alloys. Examples of plastics include, acrylonitrile styrene acrylate, acrylonitrile butadiene styrene, polycarbonate, Ultem™, Delrin®, Nylon, and other synthetic polymers and plastics.

Knowledge aggregator/reasoning engine 509 receives as input one or more axioms generated by predictive machine learning models 501, and generates predictions associated with the manufacture of a physical object, e.g. predictions associated with MPRs and/or manufacture response (both shown respectively at 106 and 119 in FIG. 1). In some instances, predictions can be based on the axioms or attributes generated by two or more machine learning models by combining the axioms using an average function, median, or other suitable type of descriptive statistical function. In other instances, axioms generated by different learning models can be evaluated through a function, such that an axiom or a set of axioms showing lower error levels and/or highest confidence values are selected from a set of candidate axioms. In other further instances, one or more axioms generated by machine learning models 501 can serve as input to a reasoning engine. Rules in the reasoning engine can be expressed in data structures denoting symbolic logic propositions, terms, and/or relations to support the reasoning of predictive engine 215. In yet some further instances, predictions can be generated through sets of linear and non-linear functions.

Knowledge aggregator/reasoning engine 509 can determine mechanical properties of a physical object specified in a digital model that depend on fabrication materials. Some mechanical properties dependent on fabrication materials determined at engine 509 include mechanical properties associated with uniaxial mechanical responses, thermodynamics mechanical responses, stress and strain mechanical responses, yield and plastic flow mechanical responses, fracture mechanical responses, and other suitable types of mechanical responses associated with a physical object to be built in a determined fabrication material. More specific examples of such mechanical properties include elastic modulus; tensile strength; tensile elongation; shear modulus; shear strength; flexural strength; flexural modulus; compression strength; compression modulus; fracture toughness; Rockwell hardness (HR) including HRA for tungsten carbides, HRB for aluminum, brass and soft steels, and HRC for hard steels (greater than HRB 100); coefficients of thermal expansion; and other suitable properties dependent on fabrication materials. Mechanical responses can be simulated with libraries from custom-made simulation software, open source software solutions, and/or commercial software such as AudoDesk® AutoCAD®, SolidWorks® or other suitable software.

In some implementations, knowledge aggregator/reasoning engine 509 can predict whether is feasible or not to manufacture a physical object using a specific fabrication material. In some instances, when is feasible to manufacture a physical object on more than one fabrication material, engine 509 can execute a multi-objective optimization based on user specified requirements to suggest one or more fabrication materials and/or fabrication technologies. The suggested fabrication materials can be expressed, for example, as an Edgeworth-Pareto solution based on user requirements and mechanical response properties of the physical object dependent on fabrication materials.

Figure 6:
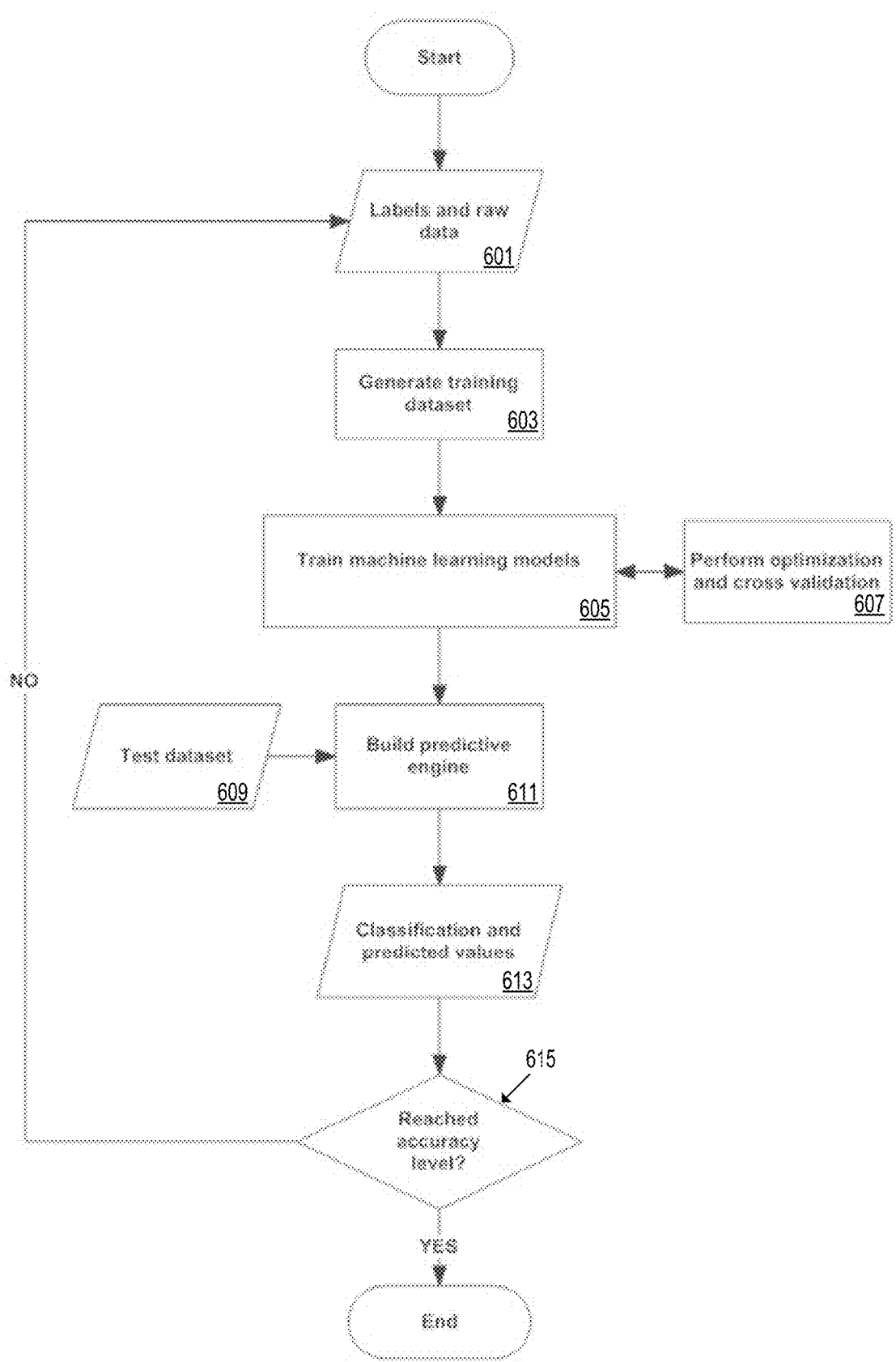
FIG. 6 is a flowchart illustrating a method to train machine learning models of a predictive system for manufacture processes, according to an embodiment.

FIG. 6 is a flowchart illustrating a training phase method for machine learning models that can be implemented in, for example, predictive machine learning models 501 shown in FIG. 5. A PSMP server (e.g., PSMP server 109 shown in FIG. 1) can implement supervised, unsupervised, and/or reinforcement based machine learning models. The method illustrated in FIG. 6 is an example of a supervised learning method; variations of this example of training method are discussed below, however, other training methods can be analogously implemented to train unsupervised and/or reinforcement machine learning models. Although the method of FIG. 6 is discussed with respect to PSMP server 109, the method can be used with other systems.

PSMP server 109 receives, at 601, a corpus of raw datasets. Each dataset in the corpus includes a labeled shape associated with an array data structure: the shapes can be 2D shapes, 3D shapes or any other shape defined in other suitable dimension space. The array data structure stores a set of data values corresponding to geometric and/or physical attributes of such a shape.

PSMP server 109 generates, at 603, a training set by executing one or more operations over the corpus received at 601. The operations, executed at 603, include the selection of a minimum set of shape attributes that can be used by, for example, a classifier to differentiate among different shapes. In some instances, such a minimum set of shape attributes can be determined by eliminating shape attributes that are highly correlated and thus, redundant. Accordingly, a dimensionality reduction process can be applied to compress the attributes onto a lower dimensionality subspace and advantageously, storage space can be minimized, resulting in the improvement or optimization of computation load used by the method. In some further instances, the attributes associated with a shape are scaled, for example, each selected attribute is expressed as a value ranging from [0 . . . 1] and/or a standard normal distribution with zero mean and unit variance.

One or more machine learning models are trained at 605. The machine learning models trained at 605 are selected based on different criteria depending on the problem to be solved and/or data available in the training set. For example, machine learning classifiers can suffer from different degrees of bias. Accordingly, more than one machine learning model can be trained at 605, optimized, improved, and cross-validated at 607. Thus, a subset of the trained machine learning models can be selected to build a predictive engine at 611 according to, for example, classification accuracy, defined as the proportion of correctly classified instances.

In some instances, machine learning models selected to build the predictive engine at 611, are further evaluated using an unseen test dataset 609. Thus, the predictive engine built at 611 generates classification values and/or predicted values at 613. Classification and/or prediction values are evaluated at 615 to determine whether such values have achieved a desired accuracy level. When such a desired accuracy level is reached, the training phase ends; when the desired accuracy level is not reached, however, then a subsequent iteration of the process shown in FIG. 6 is performed starting at 601 with variations such as, for example, considering a larger collection of raw data.

FIG. 7 is a flowchart illustrating an example of a method to generate a non-deterministic response including a set of attributes and/or axioms for the manufacture of a physical object, according to an embodiment. Datasets 709, 711, 713, and 715 can be stored in, for instance, storage device 111 (shown in FIG. 1) and/or storage device 201 (shown in FIG. 2). In some instances, manufacturing process request 106 can be received from compute device 105 (shown in FIG. 1). Alternatively, or additionally, manufacturing process request 106 can be preprocessed (e.g., data can be normalized) by independent variables preprocessor 511 shown in FIG. 5. Geometric and physical attributes of a physical object 701 can be received from a digital model extracted from MPR 106, mesh analysis engine 211, point cloud analysis engine 213, predictive engine 215, and/or independent variables preprocessor 511. Alternatively or additionally, geometric and physical attributes of physical object 701 can be produced directly from a CAD file (e.g., CAD file 115 shown in FIG. 1) via a BREP system (not shown in FIG. 7). Examples of geometric and physical attributes that can be produced via a BREP system include number, length, radius, and orientation of cylinders, as well as locations where the curvature of the surface of a digital model changes. Regression machine learning models 703 and 705 are non-parametric machine learning models that can be included in predictive machine learning models 501 discussed with reference to FIG. 5. Non-parametric machine learning models can be implemented by selecting a targeted distribution function and thereafter, training, testing, and validating the model to learn parameters of the targeted distribution function based on features learned from the training dataset. Examples of targeted functions include lognormal distributions that can be described by parameters $(\mu_i, \sigma_i)$, where $\mu_i$ indicates a mean of a sampled feature and $\sigma_i$ indicates a standard deviation of the sampled feature. The implementations described below are discussed in the context of lognormal distributions, however, other distributions can be analogously implemented including Poisson distributions, Poisson lognormal distributions, and other suitable distributions.

In some implementations, regression machine learning models 703 and 705 can include, for example, one or more deep learning models, one or more machine learning clustering models, one or more instance-based machine learning models, one or more kernel-based machine learning models, and/or any combination thereof. Examples of such deep learning models include deep Boltzmann machines, deep belief networks, convolutional neural networks, stacked autoencoders, and/or other suitable deep learning models or techniques. Examples of such clustering models include k-means, k-medium, hierarchical clustering, and/or other suitable clustering models or techniques. Examples of such instance-based machine learning models include k-nearest neighbor, locally weighted machine learning models, and/or other suitable instance-based machine learning models or techniques. Examples of such kernel-based machine learning models include relevance vector machines, support vector machines, and/or other suitable kernel-based machine learning models or techniques.

Regression Machine Learning Models Inputs and Outputs

In some implementations, regression machine learning model 703 can receive an identifier of a requestor entity (e.g., remote user 101) such as a unique username or other suitable identifier of remote user 101 (not shown in FIG. 7). Likewise, regression machine learning model 703 can receive inputs from geometric and physical attributes of a physical object 701, a quoted value or cost associated with a manufacture request, and/or MPR 106 (discussed with reference to FIG. 1). The requestor entity identifier, one or more of the data values included in inputs 106 and 701, and/or a quoted value for MPR 106 are input into regression machine learning model 703 to produce a set of parameters to define a probability distribution function that describes probabilities that a manufacturing process will be authorized by the requestor entity. In some implementations, the set of parameters is sent to multi-objective optimizer 217 such that a set of axioms and/or attributes associated with the requested manufacturing process can be optimized according to one or more competing objectives and/or conditions.

In some alternative or additional implementations, regression machine learning model 703 can determine geometric and physical attributes of an object directly from MPR 106 without relying on inputs from engines 211, 213, and/or 215. Moreover, in some implementations, regression machine learning models 703 can determine latent features of a physical object not revealed or included in geometric and physical attributes 701.

Regression machine learning model 705 predicts parameters of a targeted function to determine a probability that a processed request (e.g., processed request 117 in FIG. 1) will be accepted by one or more entities of supply chain at a given quote. For instance, regression machine learning model 705 can model a probability distribution defining a set of minimum values of attributes (e.g., quoted values or costs) of a manufacturing processes predicted to be acceptable by entities of a supply chain. For instance, entities responding to a manufacturing process request can be less or more likely to accept manufacturing process requests that comply with a predicted set of manufacturing process attributes. Such attributes can include, for instance, costs associated with the manufacture of a physical object, time needed to produce the physical object, type of material requested for the production of the physical object, and other suitable manufacturing processes attributes that can persuade or deter an entity of a supply chain to positively or negatively respond to a manufacturing request.

Training of Regression Machine Learning Models

Entities of a supply chain can authorize requests associated with manufacturing processes based on a set of features in a |D| dimensional space. Such features or dimensions can be features associated with a requestor entity, features associated with pending MPR, features associated with previous MPRs, features associated with other entities of a supply chain different from the requestor entity, and/or other suitable features as described below. In some implementations, regression machine learning model 703 can be trained to make predictions associated with an entity of a supply chain and a pending MPR. For instance, regression machine learning model 703 can be trained to predict parameters of a probability distribution to indicate the probability that a manufacturing process specified as a set of attributes will be authorized by a requestor entity. To be more specific, regression machine learning model 703 can produce coefficients of a probability distribution function to determine the probability that a manufacturing process as specified in, for example, production report 107 (shown in FIG. 1) or as specified in graphical user interface shown in FIG. 12 will be accepted by remote user 101 (also shown in FIG. 1).

In some implementations, regression machine learning model 703 can be trained with data extracted from manufacturing transactions committed or submitted by one or more entities of a supply chain (e.g., 709) and/or data associated with a requestor entity (e.g., data extracted from requestor entity profiles 711). For instance, a training dataset can include data extracted from past manufacturing process transactions 709 stored in, for example, storage device 111 (shown in FIG. 1). Likewise, regression machine learning model 705 can be trained with data extracted from manufacturing process responses 713, and/or data associated with responding entities of a supply chain 715.

In some instances (e.g., with reference to model 703), training features can be extracted from manufacture process transactions 709 including unique identifier of a requestor entities, values indicating whether a requestor entity had requested and/or authorized manufacturing process, geometric attributes, physical attributes, and/or other suitable features of physical objects requested for manufacture, number of MPRs per requestor entity, date when MPRs were received, quote associated with MPRs, number of parts requested in MPRs, and other suitable data. Likewise, training features can include data extracted from requestor entity profiles 711, for instance, how often a requestor entity submits MPRs to PSMP server 109, how often a requestor entity authorizes manufacturing processes, and other suitable data specific to requestor entities.

In some instances (e.g., with reference to model 705), training features can be extracted from manufacturing process responses 713 including unique identifiers of responding entities; values indicating whether a processed request was accepted or rejected; whether there was no response to a given processed request; geometric attributes, physical attributes, or other suitable features of a physical object requested in a processed request; and other suitable data. Moreover, training features can be extracted from responding entities profiles 715, such features indicate historical data of responding entities. Likewise, training features can include a unique identifier indicating an MPR that PSMP server 109 computed to produce a given processed request. Thus, in some instances a training dataset used to train regression machine learning model 705 can include a subset or all the data included in the training dataset used to train regression machine learning model 703.

A training dataset can be defined as an m-by-n matrix T. In some instances, during a training phase, a set of parameters of a probability distribution is produced for each row $T_i$ of the matrix T. Each row $T_i$ of matrix T is associated with an observable feature or dimension from a set of observable features from a feature space that defined as $F_d=\{f_i|1\leq i\leq |D|\}$ where $|f_i|$ represents the number of distinct levels of a feature $f_i$ and $f_{ij}$ indicates the j-th level of the i-th feature.

In some implementations, overfitting of regression machine learning models can be prevented by applying a k-means clustering technique to the set of parameters produced for each row $T_i$ of matrix T. For instance, for lognormal distributions a pair of parameters $(\mu_i, \sigma_i)$ is produced for each row $T_i$ of a training dataset T. Multiple pairs of parameters $(\mu_i, \sigma_i)$ can be grouped together in k segments based on degrees of similarities between sampled features or dimensions values included in each row $T_i$ and/or similarities among parameters $(\mu_i, \sigma_i)$ produced for each row $T_i$. Thus, data in the training dataset can be modeled as K clusters defined by distance values between the center of a K cluster and one or more features in $T_i$ from feature space $F_d$. Such distance values can be calculated, for example, by a sum of squared errors or other suitable computation. In some implementations, regression machine learning model 703 produces predicted parameters $(\mu_n, \sigma_n)$ for an unseen sample based on, for example, the computation of k-nearest neighbors, that is, by computing the average of the $(\mu_i, \sigma_i)$ parameters defining the center of K clusters surrounding the unseen sample.

Testing and Validation of Regression Machine Learning Models

Regression machine learning models can be tested and validated with datasets different from the training dataset, e.g., a testing dataset and a validation dataset, such datasets can include feature values unseen by a regression machine learning model. The objective of a test phase is to measure the predictive accuracy of a regression machine learning model. For instance, the accuracy level of predicted values computed from parameters produced during the training phase can be determined by computing the difference between predicted values and expected values as specified in the testing dataset. The objective of a validation process is to identify a subset of parameters from the set of parameters produced during the training of a regression machine learning model that better fits the targeted function. Differently stated, the purpose of the validation process is to identify a subset of parameters from the set of parameters produced during the training phase that lead to the most accurate predictions. In some instances, the validation process can include accuracy optimization techniques such as, adjusting parameters by sweeping parameter values through a given range of values, adjusting weights associated with one or more features, adjusting outlier feature values, and other suitable techniques to improve predictive accuracy.

In some implementations, values predicted by the k-nearest neighbor method described above can be used to generate a preprocessed datasets. The preprocessed datasets can be divided into a training dataset, a testing dataset, and/or a validation dataset to build an artificial neural network model (not shown in FIG. 7). Such an artificial neural network can include an input layer, at least one hidden layer, and output layer. Layers in the artificial neural network can be configured to compute outputs according to different transfer functions including log-sigmoid, tan-sigmoid, purelin, or other suitable transfer functions. In some implementations, the artificial neural network can be trained to model relationships between values predicted by the k-nearest neighbor model and attributes of a manufacturing process. Alternatively or additionally, the artificial neural network can be trained with "raw" data produced by, for example, mesh analysis engine 211, point cloud analysis engine 213, and/or predictive engine 215.

In some implementations, the artificial neural network can be trained to predict parameters of a probability distribution, and/or relationships between attributes of a manufacturing process. For instance, relationships between shape distributions included in a physical object requested for manufacture, manufacturing time associated with a shape distribution, manufacturing costs associated with a shape distribution, and other suitable relationships.

Multi-Objective Optimizer

In some implementations, multi-objective optimizer 217 receives a parametric model from regression machine learning model 703, and a parametric probability distribution function from regression machine learning model 705. Multi-objective optimizer is configured to receive a parameter indicating a multi-objective optimization condition or goal state. Examples of such multi-objective optimization conditions include, for example, maximizing a probability that a manufacturing process will be authorized by the requestor entity with a condition on gross margin, maximize the revenue associated with a manufacturing process with a condition on gross margin, maximize the gross margin associated with a manufacturing process with a condition on revenue, maximize a net revenue associated with a condition on the probability that a manufacturing process with be authorized by the requestor entity, and/or other suitable multi-objective conditions.

Multi-objective optimizer 215, can determine a set of attributes of a predicted manufacturing process based on, for example, analytical and/or iterative numerical techniques. For instance, for the manufacture of a single physical object, the parametric model received from regression machine learning model 703 and the parametric probability distribution function received from machine learning model 705 are used to determine additional models to predict, for example an expected margin, an expected cost, an expected revenue, a net revenue and other suitable values associated with MPR 106 and/or manufacture response 119 (shown at 119 in FIG. 1). Based on such additional models, multi-objective optimizer 217 determines a quote (or price) for MPR 106 that meets a selected multi-objective optimization condition. For instance, a quote for MPR 106 that maximizes or improves a probability that a requestor entity will authorize a manufacturing process while holding one or more constraints on expected margin. Although the examples of the multi-objective conditions described in this document include terms associated with expected margin, expected cost, expected revenue, and/or expected net revenue, other suitable multi-objective conditions associated with a quote of an MPR, a quote given in a processed request (e.g., at 117 shown in FIG. 1), and quotes given to particular entities of a supply chain can be predicted from output values generated by regression machine learning models trained with datasets 709, 711, 713, 714 and/or other suitable training sets including data of entities of a supply chain, requestor entities, MPRs and/or manufacture responses.

Additionally or alternatively, the set of attributes produced at 707 can be used to iteratively tune or fit artificial neural networks implemented at regression machine learning models 703 and 705. For instance, if the manufacture of a set of physical objects including multiple and distinct physical objects is requested via MPR 106, a representative sample of N physical objects is selected from the set to tune or fit the artificial neural networks at 703 and 705. Accordingly, the artificial neural networks can output, for example, an aggregated quote (or price) for the whole set of physical objects such that, the quoted amount satisfies or complies with a selected multi-objective condition. Thus, in some instances, an aggregated quote determined for the requested set of physical objects can satisfy a selected multi-objective condition while an amount quoted for one or more of the physical objects in the set may not.

Multi-objective optimizer 215, outputs a set of attributes at 707 of a predicted manufacturing process for MPR 106. The set of attributes outputted at 707 primarily depends on inputs 106 and 701. The set of attributes also depends on the multi-objective condition selected for multi-objective optimizer 217, manufacturing transactions submitted by the requestor entity 709, requestor entity profiles 711, manufacturing process responses 713, responding entity profiles 715, and other suitable data used for the training of machine learning models.

FIG. 8 is a flowchart illustrating an example of a method to implement an evolutionary model for multi-objective optimization for manufacture processes, according to an embodiment. In some implementations, one or more evolutionary models can be implemented in multi-objective optimizer 217 to determine attributes associated with a manufacturing process. In general, evolutionary models work under a principle that specifies that given an initial population of individuals (samples), a rise in the fitness of such a population is experienced over time due to natural selection. When a domain of candidate solutions is represented as an initial population, an optimal solution(s) can be determined over time through the execution of evolutionary models.

Several types of evolutionary models can be implemented in PSMP server 109 including models based on genetic algorithms (GA), models based on evolution strategy (ES) algorithms, models based on evolutionary programming (EP), models based on genetic programming (GP), models based on differential evolution (DE) technique, and other suitable evolutionary models. Accordingly, different data structures can be used to implement such algorithms including strings over a finite alphabet, real-valued vectors, finite state machines, tree structures, and other suitable data structures.

In some implementations, PSMP server 109 initializes, at 801, a population of a first generation (G=0) by producing a random sample of candidate solutions. For example, candidate solutions can be provided as set of random shape distributions determined as a function of distance(s) between two random points laying on a surface of a digital model and/or attribute values associated with a manufacturing process request. As discussed with reference to FIG. 3, shape distributions can be defined as a function of distance(s) between two random points laying on a surface of a digital model. Each of the candidate solutions is evaluated at 807 based on an evaluation function. Such an evaluation function is used to assign a fitness value 809 to each of the candidate solutions. In some implementations, an evaluation function can include parameters produced by regression machine learning model 803 and regression machine learning model 805, for instance, the evaluation function can include terms based on predictive values generated by either regression machine learning model 803 and 805.

Regression machine learning model 803 can determine a probability that a manufacturing process will be authorized by the requestor entity. In some implementations, regression machine learning model can be implemented as a gradient boosting regressor model, while in other implementations regression machine learning model 803 can be implemented as discussed with reference to model 703 shown in FIG. 7. Regression machine learning model 805 can determine a probability that a processed request (e.g., processed request 117 in FIG. 1) will be accepted by one or more entities of supply chain. In some implementations regression machine learning model 805 can be implemented as a random forest regressor as discussed with reference to FIG. 10 below, while in other implementations regession machine learning model 805 can be implemented as discussed with reference to model 705 shown in FIG. 7. In some implementations, an evaluation of each element of the population executed at 807 can be configured to, for example, improve probabilities predicted via regression machine learning model 803 and/or 805. Thus, better fitness values can be assigned at 809 to those candidate solutions that improve such probabilities.

A termination condition is then evaluated at 811. In some implementations, a termination condition can based on any of: 1) a known optimal fitness level, 2) a time based condition, 3) a total number of executed fitness evaluations, 4) a threshold representing fitness improvement shown by a number of generations, 5) a measure of how much population diversity drops over a number of generations, and/or any combination of these conditions and other suitable conditions to prevent the process of FIG. 8 from iterating an infinite number of times while providing an optimized or improved set of solutions upon the last executed iteration. In some implementations, a termination condition can include a multi-objective optimization condition as discussed with reference to FIG. 7.

In some instances, when the termination condition at 811 is met, then the evolutionary model generates at 813 a set of attributes associated with a manufacturing process request, thereafter. In other instances, when the termination condition at 811 is not met, then a set of candidate solutions is selected as parents based on fitness and/or quality criteria, e.g., based on fitness values assigned at 809. Selected candidate solutions are used as parents to produce a subsequent generation of candidate solutions via the execution of crossover process at 815. For example, pairs of candidate solutions can be recombined at 815 to generate offspring candidate solutions.

A stochastic mutation operator is applied at 817 to offspring candidate solutions. Thus, population of a subsequent generation is initialized at 819 which is subjected to evaluation at 807. In some implementations, the fittest individuals or candidate solutions are selected for the next generation at 819, i.e., a next iteration of the loop shown in FIG. 8 until termination condition 811 is satisfied.

Figure 9:
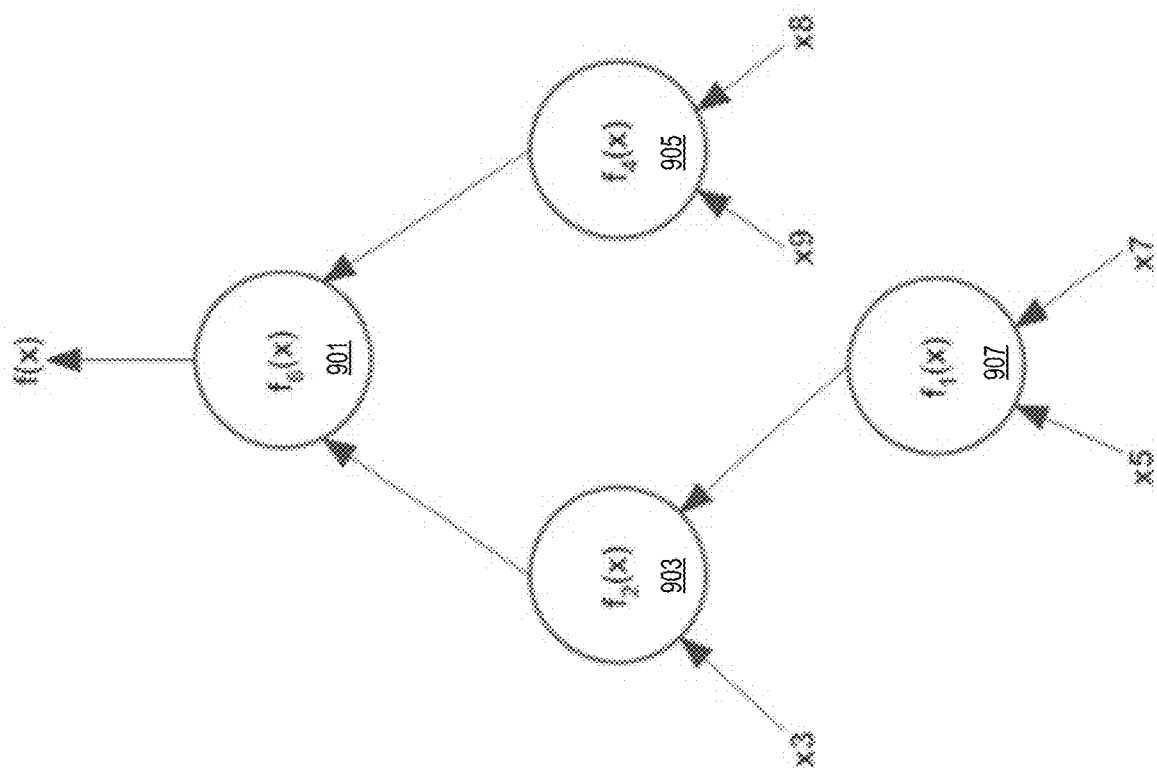
FIG. 9 is a data structure for symbolic regression built via an evolutionary model of a predictive system for manufacture processes, according to an embodiment.
Figure 10:
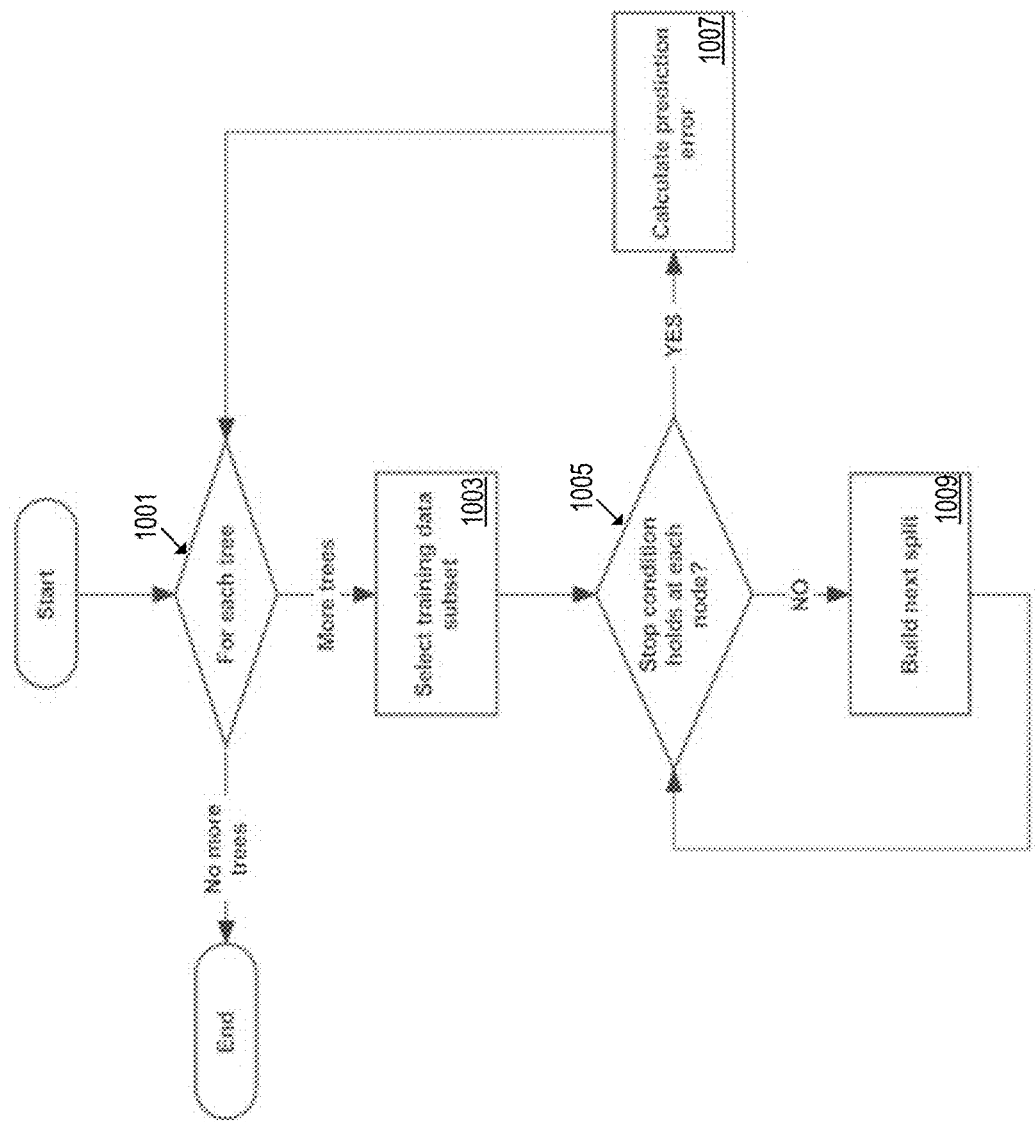
FIG. 10 is a flowchart illustrating a method to build a random forest classifier machine learning model, according to an embodiment.

FIG. 9 is a data structure for symbolic regression built via an evolutionary model of a predictive system for manufacture processes, according to an embodiment. A specific application of evolutionary process discussed with reference to FIG. 8 in conjunction with symbolic regression is described below with respect to FIG. 9. In some implementations, evolutionary models are used to infer function approximations represented in tree structures as the example shown in FIG. 9. The advantage of such models over other function learners is that they automatically discover an underlying structure of a function.

The objective of polynomial function approximation is to infer a polynomial p(x) that is capable of mapping reliably not only the data provided in a training set, but also on average unseen data, which is generated by sources similar to the sources used to obtained a training set. The approximation problem can be expressed as follow: given instantiated vectors of independent variables $xi=(x_{i1}, x_{i2}, \ldots, x_{id}) \in R^d$ and dependent variable values $y_i \in R$ find models p(x) optimally close to their unknown source function f(x)=y.

High-order multivariate polynomials are a universal format for function modeling with which any continuous mapping may be approximated up to an arbitrary precision, in average squared residual sense, if there are a sufficiently large number of terms. Such polynomials are defined by the power series:

$$p(x) = a_0 + \Sigma_{m=1}^{M} a_m \Pi_{j=1}^{d} x_j^{r_{jm}} \qquad (3)$$

where $a_m$ are the term coefficients, m ranges up to a preselected maximum number of terms M: m≤M; $x_j$ are the independent variable values of the input vector x, j≤d numbers; and $r_{jm}$ is bound by a maximum polynomial order (degree) s: $\Sigma_j^d r_{jm} \leq s$ for every m.

Polynomials (3) are combinations of terms that are linear in the coefficients, and non-linear in the variables. Cross-product and power terms are derived from standard basis $\emptyset = (1, x_1, x_2, \ldots, x_d, x_1^2, x_1x_2, x_1x_3, \ldots, x_1^3, x_1^2x_2, x_1^2x_3, \ldots)$. Using this basis $\emptyset$, a high-order multivariate polynomial can be defined with the equation:

$$p(x) = \Sigma_{m=0}^{M} a_m \emptyset_m(x) \qquad (4)$$

where $a_m$ are the coefficients, and $\emptyset_m$ are the basis functions from $\emptyset$. Basis functions of $h_m$ are used to emphasize that only a small subset of $\emptyset$ is considered.

In some instances, an overall polynomial can be defined as a hierarchical composition of simple transfer polynomials whose coefficients are calculated by least square methods. These simple transfer polynomials are primitive functions that once composed hierarchically do not rapidly increase the overall polynomial degree. In FIG. 9, simple transfer polynomials are represented in the nodes 901, 903, 905, and 907. Overall polynomials (e.g., f(x) at the top of FIG. 9) are used to determine different geometric and physical attributes of a physical object. Independent variables $x_3$, $x_5$, $x_7$, $x_9$, and $x_8$ can correspond to data values associated with a physical object generated by, for example, mesh analysis engine 211, point cloud analysis engine 213 and/or retrieved directly from data included in a digital model. Examples of such independent variables include data values corresponding to a surface areas of the physical object, 3-tuple data structures including a length value, a width value, and a height value associated with a prism enclosing the digital model (i.e., bounding box), 3-tuple data structures with coordinate data values of a center of the prism, data values corresponding to volume of convex hulls enclosing digital models, data values corresponding to moments of inertia of physical objects, data values corresponding to surface areas of a physical object associated with a computer numerical control machine operation, data values corresponding to a number of holes associated with a physical object, and/or other suitable attributes. Additionally, or alternatively, independent variables can include data values extracted from MPRs such as requested fabrication material, requested surface finish, requested tolerances, and/or other suitable independent variables associated with the physical objected requested in a MPR.

Polynomials can be represented as tree structures. Each tree structure contains nodes with complete bivariate second degree transfer polynomials such as $p(x) = a_0 + a_1x_1 + a_2x_2 + a_3x_1x_2 + a_4x_1^2 + a_5x_2^2$. Independent variables are represented as terminal leaves in the example illustrated in FIG. 9.

A polynomial can be built from a tree structure using a vertical technique. Having a finite number N of data D={($x_i$, $y_i)\}_{i=1}^N$ from independent variable vectors $x_i$ and their corresponding outcomes $y_i$, mean square error methods can be used for finding polynomial coefficients $a_m$. Coefficients of the transfer polynomials at each node are computed by, for example, the execution of ordinary least square (OLS) fitting equation provided below:

$$a = (H^T H)^{-1} H^T y \qquad (5)$$

where a is $(m+1) \times 1$ column vector, H is $N \times (m+1)$ design matrix of row vectors $h(x_i) = (h_0(x_i), h_1(x_i), \ldots, h_m(x_i))$, $m \leq M$, $i=1 \ldots N$, y is the $N \times 1$ output column vector, and $Ha=p$.

An evolutionary model as described with reference to FIG. 8 can be used to define polynomials for the determination of different attributes of a physical object. For example, an initial population of trees can be generated through a ramped half-and-half method. The best trees can be probabilistically selected as parents of a new generation. Crossover can be applied by selecting a random node from each parent tree as the crossover point to generate two new offspring for the next generation. Mutation can be performed by selecting a node as the mutation point and a new node or subtree is generated originating at the mutation point and replacing the branch that was derived originally from the selected mutation point.

In some implementation, a collection of tree structures as the one shown in FIG. 9 are executed by multi-objective optimizer 217 discussed with reference to FIG. 2. Accordingly, polynomial terms, cross terms, transcendental functions and other suitable expressions and values can be calculated by multi-objective optimizer 217.

FIG. 9 is a flowchart illustrating a method to build a random forest regressor and/or classifier machine learning model, according to an embodiment. Given training dataset TS with a shape identifier (SID) and a collection of physical and/or geometric attributes below {A1, A2, A3 ... An}, TS can be expressed as follows:

$$TS = \begin{bmatrix} A1 & A2 & A3 & \ldots & SID1 \\ A1 & A2 & A3 & \ldots & SID2 \\ A1 & A2 & A3 & \ldots & SID3 \end{bmatrix} \qquad (6)$$

A collection of trees are generated from the training set TS. For each tree, a different subset of random attributes is taken into account to define a random training set. For example $TS_1$ and $TS_2$ can be defined as below:

$$TS_1 = \begin{bmatrix} A1 & A2 & A3 & \ldots & SID1 \\ A16 & A4 & A91 & \ldots & SID2 \\ A7 & A22 & A53 & \ldots & SID3 \end{bmatrix} \qquad (7)$$

$$TS_2 = \begin{bmatrix} A63 & A54 & A48 & \ldots & SID1 \\ A9 & A12 & A79 & \ldots & SID2 \\ A68 & A12 & A31 & \ldots & SID3 \end{bmatrix} \qquad (8)$$

A decision tree is generated for each of the defined random training sets. The collection of decision trees is known as the random forest. Differently stated, a random forest can be a classifier or regressor including a collection of tree-structured classifiers or regressors $\{h(x, \Theta k), k=1, \ldots\}$ where the $\{\Theta k\}$ are independent identically distributed random vectors and each decision tree casts a unit vote for the most popular class at input x. In other words, building a random forest comprises the task of generating random vectors to grow an ensemble of decision trees and letting those decision trees vote for the most popular class. In some implementations, a final prediction can be based on the average of predictions from the entire forest or a majority of vote classification.

An example of a process to implement a random forest classifier or regressor is provided below. Assume a number of decision trees to grow is t, then for each decision tree (at 1001) select a training data subset n as shown at 1003 from the training set TS (e.g., bagged subset of samples or bootstrap sample). The conditional statement at 1005 determines whether a stop condition holds at each node of a growing decision tree. The stopping condition depends on the selected training data subset n. Some examples of the condition evaluated at 1005 include the number of training samples at the node, if a maximum depth is reached or other suitable conditions.

If such condition is satisfied, the current node becomes a leaf node and a prediction error for the decision tree is calculated at 1007. If the stop condition at 1005 does not hold, an internal node is grown and a split function is selected from a pool of random functions such that training errors from n are minimized. The selected split function induces a partition of the subset n into two sets, which in turn become the left and right children nodes of the current node where the training procedure is continued. Further details regarding an example implementation of a splitting function are discussed with reference to FIG. 11.

Figure 11:
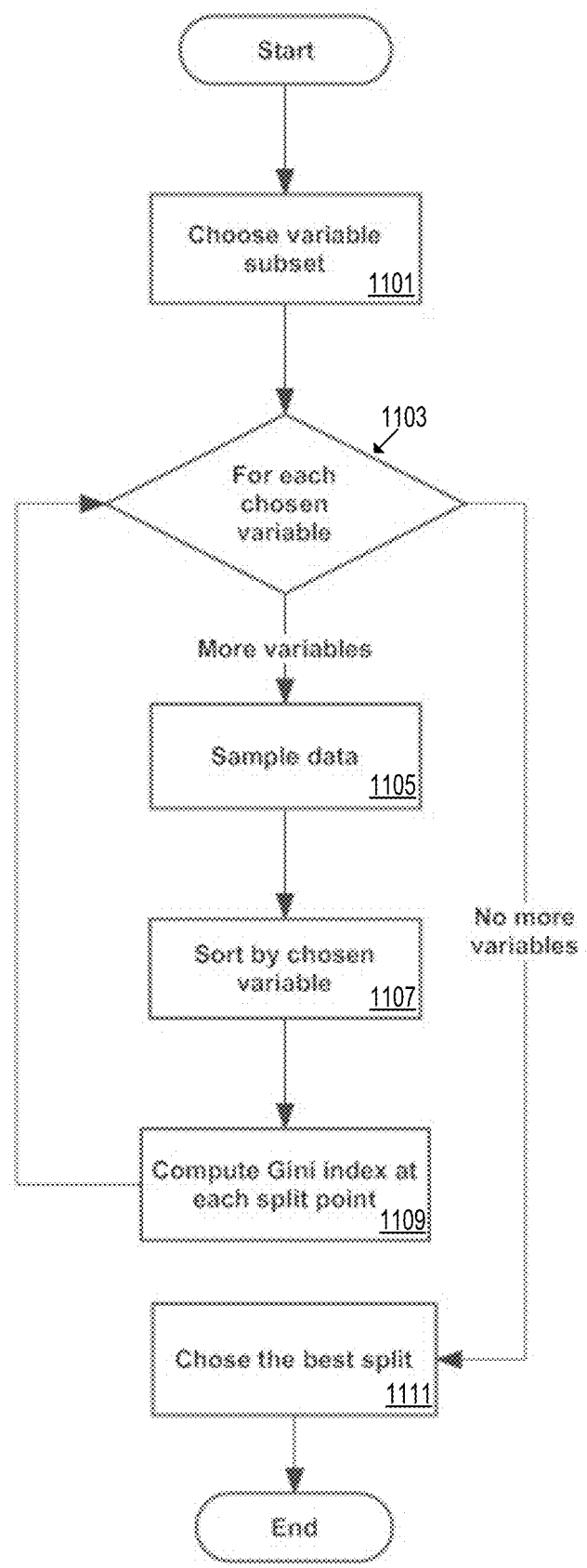
FIG. 11 is a flowchart illustrating a method for applying a splitting criterion to a random forest classifier machine learning model, according to an embodiment.

FIG. 11 is a flowchart illustrating a method for applying a splitting criterion to a random forest classifier machine-learning model, according to an embodiment. In some implementations, an impurity-based Gini index is used as an attribute selection measure to assess splitting criterion. Accordingly, for a node, a subset of variables is randomly selected at 1101. An iterative loop starts at 1103 in which for each of the sampled data 1105 is sorted by the chosen variable at 1107. Thereafter, at 1109, the Gini index or other suitable function is computed at each split point. The Gini index measures the impurity of a dataset. The Gini index considers a binary split for each attribute. Gini index point of a set is defined as follows:

$$Gini(S) = 1 - \Sigma_{i=0}^m p_i^2 \qquad (9)$$

where $p_i$ is the proportion of observations or samples with a target variable (e.g., SID) and m is the number of different values taken by the target variable. The best split for each attribute is chosen at 1111 for instance, values or data points indicating a higher Gini index are considered to be better split candidates than values or data points indicating a smaller Gini index.

Figure 12:
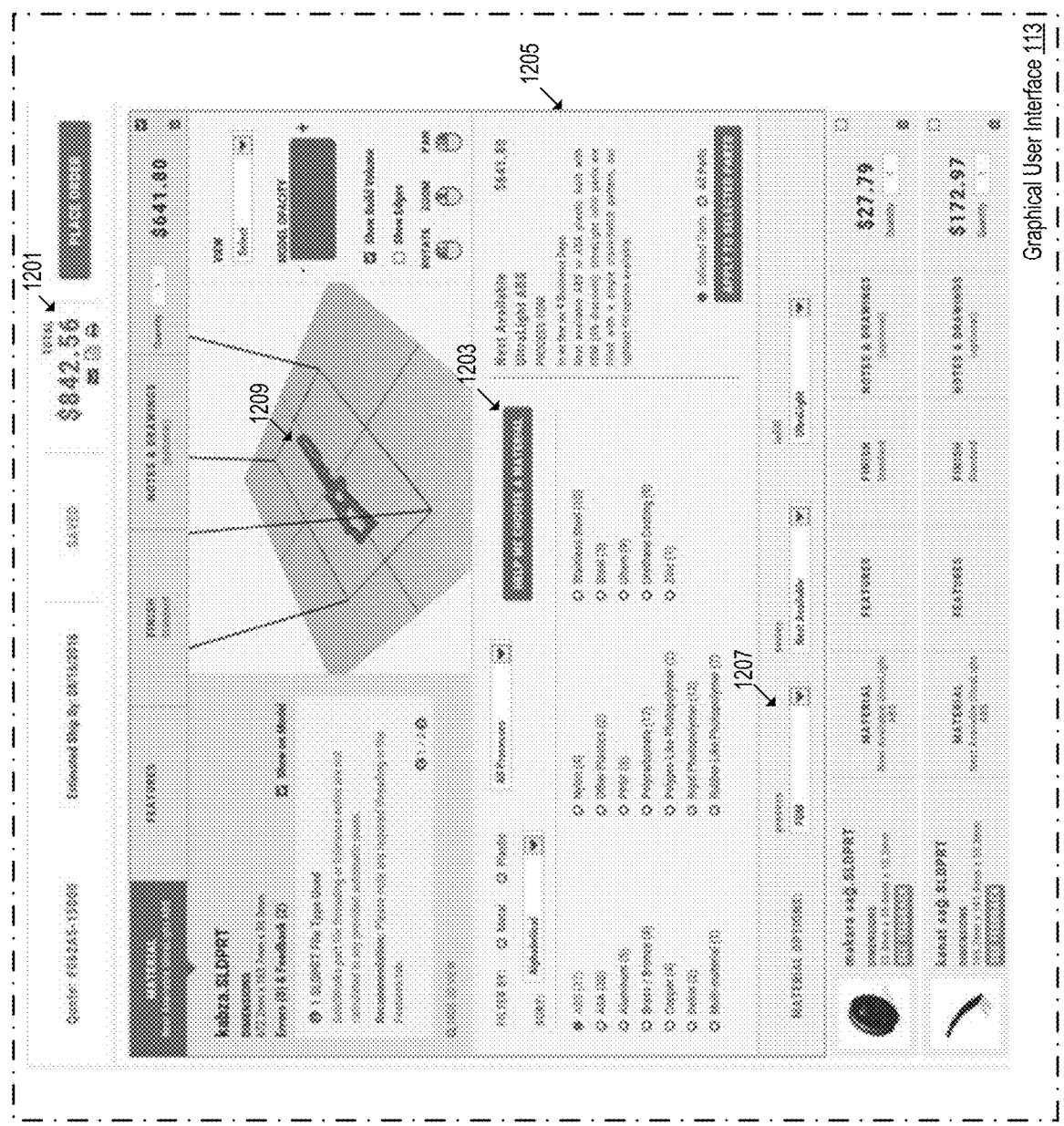
FIG. 12 is an example of an output from a graphical user interface of the predictive system for manufacture processes and related to predicted outcomes associated with the manufacture of a physical object, according to an embodiment.

FIG. 12 is an example of an output from a graphical user interface of the predictive system for manufacture processes and related to predicted outcomes associated with the manufacture process request of a physical object, according to an embodiment. Graphical user interface 113 corresponds to the graphical user interface shown in FIG. 1. The graphical user interface 113 displays several of the predictions generated by the PSMP server 109. Predictions include a total cost or quote 1201 to manufacture on or more physical object according to a manufacturing process request. Note that in some implementations, total cost 1201 can be generated as an attribute of a manufacturing process produced at 707 in FIG. 7, and/or at 813 at FIG. 8. Thus, total cost 1201 can satisfy multi-objective optimization conditions including, for example, maximizing a probability that a manufacturing process will be authorized by the requestor entity with a condition on gross margin, maximize the revenue associated with a manufacturing process with a condition on gross margin, maximize the gross margin associated with a manufacturing process with a condition on revenue, maximize a net revenue associated with a condition on the probability that a manufacturing process with be authorized by the requestor entity, and/or other suitable multi-objective conditions.

A requestor entity can use button 1203 to select among different materials that can be used to manufacture a physical object. Estimated time to receive a prototype in a variety of production grade thermoplastics, and its associated costs are shown at 1205. Graphical user interface 113 includes a dropdown menu with available prototyping technologies at 1207 that can be used to manufacture a physical object specified in a digital model 1209, in this case, fuse deposition modeling.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

The invention claimed is:

1. A system for predictions of manufacturing processes, comprising:
    a graphical user interface tool including computerized instructions for receiving, at a compute device, a manufacturing process request including a digital model representative of a physical object to be manufactured;
    an object analysis engine including computerized instructions for generating, from the digital model, a set of features associated with the physical object; and
    a predictive engine including computerized instructions for producing at least one non-deterministic predictive value associated with manufacturing the physical object, based at least in part upon at least one of the set of features or information derived from the set of features, and based at least in part upon one or more machine learning models;
    wherein at least one of the one or more machine learning models trained using a set of previously manufactured physical objects; and
    wherein the graphical user interface tool further includes computerized instructions for providing to a user a prediction report associated with manufacturing the physical object, the prediction report including information based upon the at least one non-deterministic predictive value.

2. The system of claim 1, wherein the set of features include (i) values corresponding to surface orientations associated with the physical object and (ii) values corresponding to non-planar surface areas associated with the physical object.

3. The system of claim 2, wherein the set of features further include a plurality of the following: (iii) values corresponding to a volume of the physical object, (iv) values corresponding to a surface area of the physical object, (v) values corresponding to convex hull volume of the physical object, and (vi) values corresponding to length, width and height of a prism enclosing the physical object.

4. The system of claim 1, wherein at least one of the machine learning models is trained using unsupervised machine learning.

5. The system of claim 1, wherein at least one of the machine learning models is trained with an incomplete training set.

6. The system of claim 1, wherein at least one of the machine learning models is a regression machine learning model.

7. The system of claim 6, wherein the at least machine learning model is a non-parametric machine learning model.

8. The system of claim 1, wherein the predictive engine also produces a deterministic property and the prediction report also includes information based upon the deterministic property.

9. The system of claim 1, wherein information based upon the non-deterministic predictive value includes probabilities associated with entities of a supply chain.

10. The system of claim 1, wherein the manufacturing process request further includes, and the predictive engine further takes as input from the manufacturing process request, one or more of (a) a number of requested parts, (b) previous manufacturing transactions committed by a requesting entity, or (c) time when a request is expected to be fulfilled.

11. The system of claim 1, wherein the predictive engine produces the at least one non-deterministic predictive value based further upon one or more candidate shape distributions retrieved as a pre-classifier of physical object shape.

12. The system of claim 1, wherein the at least one machine learning model is a neural network machine learning model.

13. The system of claim 1, wherein at least one of the machine learning models is trained using unsupervised machine learning trained with an incomplete training set.

14. The system of claim 1, wherein the non-deterministic predictive value is in the form of a probability distribution function.

15. The system of claim 1, wherein the non-deterministic predictive value includes a probability that a request will be accepted by one or more entities of a supply chain.

16. The system of claim 1, wherein the non-deterministic predictive value includes a probability that a manufacturing process will be authorized by a requester entity.

17. The system of claim 1, wherein the manufacturing process request further includes, and the predictive engine further takes as input from the manufacturing process request, one or more of (a) a requested fabrication material, (b) a requested surface finish, or (c) a requested tolerance.

18. The system of claim 1, wherein the information based upon the at least one non-deterministic predictive value in the prediction report includes cost information.

19. The system of claim 1, wherein the information based upon the at least one non-deterministic predictive value in the prediction report includes a quote to manufacture one or more of the physical object.

20. The system of claim 1, wherein the prediction report is provided by the graphical user interface in near real-time upon receiving the manufacturing process request by the graphical user interface.

21. The system of claim 1, wherein the object analysis engine generates from the digital model, a set of features associated with the physical object corresponding to at least one of (a) a discretized version of the digital model or (b) a point cloud processing of the digital model.

22. A system for predictions of manufacturing processes, comprising:
a graphical user interface tool including computerized instructions for receiving, at a compute device, a manufacturing process request including a digital model representative of a physical object to be manufactured;
an object analysis engine including computerized instructions for generating, from the digital model, a set of features associated with the physical object; and
a predictive engine including computerized instructions for producing at least one non-deterministic predictive value associated with manufacturing the physical object, based at least in part upon at least one of the set of features or information derived from the set of features, and based at least in part upon one or more machine learning models, at least one of the machine learning models being an unsupervised machine learning model trained with an incomplete training set;
wherein at least one of the one or more machine learning models trained using a set of previously manufactured physical objects; and
wherein the graphical user interface tool further includes computerized instructions for providing to a user a prediction report associated with manufacturing the physical object, the prediction report including manufacturing cost information based upon the at least one non-deterministic predictive value.

* * * * *